(12) United States Patent
Li Pi Shan et al.

(10) Patent No.: US 8,686,087 B2
(45) Date of Patent: Apr. 1, 2014

(54) BLOCK COMPOSITES IN SOFT COMPOUNDS

(75) Inventors: Colin Li Pi Shan, Pearland, TX (US); Kim L. Walton, Lake Jackson, TX (US); Gary R. Marchand, Lake Jackson, TX (US); Ashish Batra, Pearland, TX (US); Eddy I. Garcia-Meitin, Angleton, TX (US); Jeffrey D. Weinhold, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 228 days.

(21) Appl. No.: 12/896,553

(22) Filed: Oct. 1, 2010

(65) Prior Publication Data

US 2011/0082249 A1 Apr. 7, 2011

Related U.S. Application Data

(60) Provisional application No. 61/248,160, filed on Oct. 2, 2009, provisional application No. 61/248,147, filed on Oct. 2, 2009, provisional application No. 61/248,170, filed on Oct. 2, 2009.

(51) Int. Cl.
*C08L 53/00* (2006.01)

(52) U.S. Cl.
USPC .......................................... 524/505; 524/528

(58) Field of Classification Search
USPC .................................................. 524/505, 528
See application file for complete search history.

(56) References Cited

U.S. PATENT DOCUMENTS

| | | | | |
|---|---|---|---|---|
| 7,160,949 | B2 * | 1/2007 | Ota et al. | ....................... 525/242 |
| 2006/0111528 | A1 * | 5/2006 | Coates et al. | ................. 526/172 |
| 2006/0199887 | A1 | 9/2006 | Liang et al. | |
| 2006/0211819 | A1 * | 9/2006 | Hoenig et al. | ................... 525/88 |
| 2007/0112127 | A1 | 5/2007 | Soediono et al. | |
| 2008/0269412 | A1 | 10/2008 | Carnahan et al. | |

FOREIGN PATENT DOCUMENTS

| | | |
|---|---|---|
| DE | 202008014218 U1 | 3/2010 |
| WO | 2007/035485 A1 | 3/2007 |
| WO | 2009012152 A1 | 1/2009 |
| WO | 2009097529 A1 | 8/2009 |

OTHER PUBLICATIONS

U.S. Appl. No. 12/896,538.
U.S. Appl. No. 13/499,857.
U.S. Appl. No. 12/896,585.
U.S. Appl. No. 13/499,862.
U.S. Appl. No. 13/499,859.
PCT/US2010/051159 Intl Preliminary Report on Patentability.
PCT/US2010/051159 Intl Search Report.
PCT/US2010/051159 Written Opinion.

* cited by examiner

*Primary Examiner* — Robert D. Harlan

(57) ABSTRACT

Embodiments of the invention provide block composites and their use in soft compounds.

11 Claims, 17 Drawing Sheets

- Inventive example
- Control sample
- ▲ Comparative A
- ◆ Comparative B

BLOCK COMPOSITES IN SOFT COMPOUNDS

CROSS-REFERENCE TO RELATED PATENT APPLICATIONS

This application claims priority from U.S. Provisional Application Ser. No. 61/248,160, filed Oct. 2, 2009. This application is also related to the following U.S. Provisional Patent Applications also filed Oct. 2, 2009 with Ser. Nos. 61/248,147; and 61/248,170. For purposes of United States patent practice, the contents of these applications are herein incorporated by reference in their entirety.

FIELD OF THE INVENTION

This invention relates to block composites and their use in soft compounds.

BACKGROUND OF THE INVENTION

The manufacture of durable goods in the United States alone accounts for millions of tons of plastics consumption annually. Durable goods are manufactured products capable of long utility which are found in various markets such as the automotive, construction, medical, food and beverage, electrical, appliance, business machine, and consumer markets. Some applications in these markets require the use of flexible polymers or blends thereof with other polymers or with oils. These applications include, but are not limited to, toys, grips, soft touch handles, bumper rub strips, floorings, auto floor mats, wheels, casters, furniture and appliance feet, tags, seals, gaskets such as static and dynamic gaskets, automotive doors, bumper fascia, grill components, rocker panels, hoses, linings, office supplies, seals, liners, diaphragms, tubes, lids, stoppers, plunger tips, delivery systems, kitchen wares, shoes, shoe bladders and shoe soles.

For use in durable goods applications, polymers, or blends thereof with other polymers or oil, desirably possess good processibility (e.g., moldability), appealing appearance (e.g., clear or colorable), suitable surface properties (e.g., good adhesion to substrates, rubber-like feel, non-stickiness and good paintability), and a good combination of mechanical properties (e.g., flexibility, heat resistance, abrasion and/or scratch resistance, toughness, tensile strength, and compression set). Some polymers that possess suitable properties for durable goods include flexible polyvinylchloride (f-PVC), poly(styrene-butadiene-styrene) (SBS), poly(styrene-ethylene/butadiene-styrene) (SEBS), thermoplastic vulcanizates (TPV), thermoplastic poly(urethane) (TPU), and polyolefins such as polyolefin homopolymers and polyolefin interpolymers.

Some polyolefins such as polypropylene (PP) and low density polyethylene (LDPE) have found wide acceptance for use in durable goods applications for their ease of molding, good heat resistance and mechanical properties. Furthermore, many formulations based on blends of polyolefins and other polymers have been developed to meet the demands required by the production of parts of durable goods. For example, a blend of polypropylene and polyethylene can be used to manufacture fibers for artificial turf applications.

Further, some flexible polymers including some polyolefin homopolymers or polyolefin interpolymers may be tacky, which is an undesirable property in some processes or applications. In general, additives such as fatty acid amides, waxes or other non-tacky polymers can be mixed with such flexible polymers to reduce their tackiness. However, such additives are only effective to some degree and are known to have some undesirable properties of their own.

Despite the availability of a variety of polyolefins and their blends, there exists a continuing need for new polymers or new polymer blends that have improved properties and performance characteristics.

SUMMARY OF THE INVENTION

Formulated compositions have now been discovered to have this combination of good low temperature impact performance and modulus. The compositions comprise:
A) a block composite, and
B) an oil.

DESCRIPTION OF EMBODIMENTS OF THE INVENTION

Definitions

Figure 1:
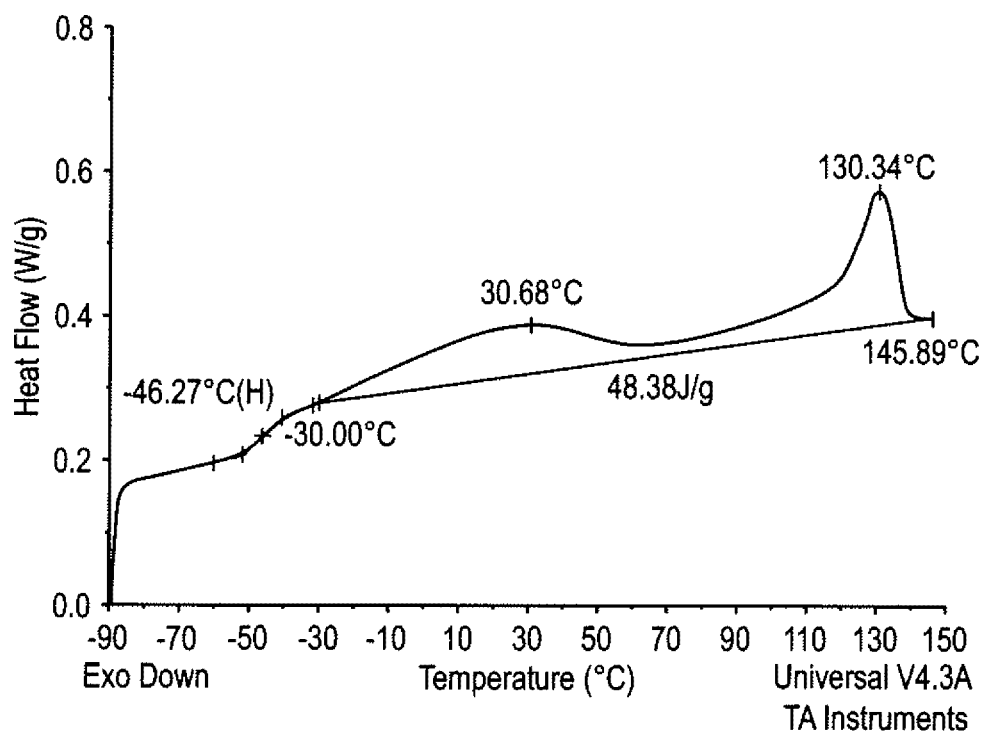
FIG. 1 shows the DSC melting curve for Example B1.

All references to the Periodic Table of the Elements herein shall refer to the Periodic Table of the Elements, published and copyrighted by CRC Press, Inc., 2003. Also, any references to a Group or Groups shall be to the Group or Groups reflected in this Periodic Table of the Elements using the IUPAC system for numbering groups. Unless stated to the contrary, implicit from the context, or customary in the art, all parts and percents are based on weight. For purposes of United States patent practice, the contents of any patent, patent application, or publication referenced herein are hereby incorporated by reference in their entirety (or the equivalent US version thereof is so incorporated by reference) especially with respect to the disclosure of synthetic techniques, definitions (to the extent not inconsistent with any definitions provided herein) and general knowledge in the art.

The term "comprising" and derivatives thereof is not intended to exclude the presence of any additional component, step or procedure, whether or not the same is disclosed herein. In order to avoid any doubt, all compositions claimed herein through use of the term "comprising" may include any additional additive, adjuvant, or compound whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed. The term "or", unless stated otherwise, refers to the listed members individually as well as in any combination.

The term "polymer", includes both conventional homopolymers, that is, homogeneous polymers prepared from a single monomer, and copolymers (interchangeably referred to herein as interpolymers), meaning polymers prepared by reaction of at least two monomers or otherwise containing chemically differentiated segments or blocks therein even if formed from a single monomer. More specifically, the term "polyethylene" includes homopolymers of ethylene and copolymers of ethylene and one or more $C_{3-8}$ α-olefins in which ethylene comprises at least 50 mole percent. The term "crystalline" if employed, refers to a polymer or polymer block that possesses a first order transition or crystalline melting point (Tm) as determined by differential scanning calorimetry (DSC) or equivalent technique. The term may be used interchangeably with the term "semicrystalline". The term "amorphous" refers to a polymer lacking a crystalline melting point. The term, "isotactic" is defined as polymer repeat units having at least 70 percent isotactic pentads as determined by $^{13}$C-NMR analysis. "Highly isotactic" is defined as polymers having at least 90 percent isotactic pentads.

The term "block copolymer" or "segmented copolymer" refers to a polymer comprising two or more chemically distinct regions or segments (referred to as "blocks") preferably joined in a linear manner, that is, a polymer comprising chemically differentiated units which are joined end-to-end with respect to polymerized ethylenic functionality, rather than in pendent or grafted fashion. In a preferred embodiment, the blocks differ in the amount or type of comonomer incorporated therein, the density, the amount of crystallinity, the crystallite size attributable to a polymer of such composition, the type or degree of tacticity (isotactic or syndiotactic), regio-regularity or regio-irregularity, the amount of branching, including long chain branching or hyper-branching, the homogeneity, or any other chemical or physical property. The block copolymers of the invention are characterized by unique distributions of both polymer polydispersity (PDI or Mw/Mn), block length distribution, and/or block number distribution, due, in a preferred embodiment, to the effect of the shuttling agent(s) in combination with the catalyst(s).

The term "block composite" refers to the novel polymers of the invention comprising a soft copolymer, a hard polymer and a block copolymer having a soft segment and a hard segment, wherein the hard segment of the block copolymer is the same composition as the hard polymer in the block composite and the soft segment of the block copolymer is the same composition as the soft copolymer of the block composite. The block copolymers can be linear or branched. More specifically, when produced in a continuous process, the block composites desirably possess PDI from 1.7 to 15, preferably from 1.8 to 3.5, more preferably from 1.8 to 2.2, and most preferably from 1.8 to 2.1. When produced in a batch or semi-batch process, the block composites desirably possess PDI from 1.0 to 2.9, preferably from 1.3 to 2.5, more preferably from 1.4 to 2.0, and most preferably from 1.4 to 1.8.

"Hard" segments refer to highly crystalline blocks of polymerized units in which the monomer is present in an amount greater than 95 weight percent, and preferably greater than 98 weight percent. In other words, the comonomer content in the hard segments is less than 5 weight percent, and preferably less than 2 weight percent. In some embodiments, the hard segments comprise all or substantially all propylene units. "Soft" segments, on the other hand, refer to amorphous, substantially amorphous or elastomeric blocks of polymerized units in which the comonomer content is greater than 10 mol %.

The block composite polymers of the invention are preferably prepared by a process comprising contacting an addition polymerizable monomer or mixture of monomers under addition polymerization conditions with a composition comprising at least one addition polymerization catalyst, a cocatalyst and a chain shuttling agent, said process being characterized by formation of at least some of the growing polymer chains under differentiated process conditions in two or more reactors operating under steady state polymerization conditions or in two or more zones of a reactor operating under plug flow polymerization conditions.

In a preferred embodiment, the block composites of the invention comprise a fraction of block polymer which possesses a most probable distribution of In a preferred embodiment, the polymers of the invention possess a most probable distribution of block lengths. Preferred polymers according to the invention are block copolymers containing 2 or 3 blocks or segments. In a polymer containing three or more segments (that is blocks separated by a distinguishable block) each block may be the same or chemically different and generally characterized by a distribution of properties. In a process for making the polymers, chain shuttling is used as a way to prolong the lifetime of a polymer chain such that a substantial fraction of the polymer chains exit at least the first reactor of a multiple reactor series or the first reactor zone in a multiple zoned reactor operating substantially under plug flow conditions in the form of polymer terminated with a chain shuttling agent, and the polymer chain experiences different polymerization conditions in the next reactor or polymerization zone. Different polymerization conditions in the respective reactors or zones include the use of different monomers, comonomers, or monomer/comonomer(s) ratio, different polymerization temperatures, pressures or partial pressures of various monomers, different catalysts, differing monomer gradients, or any other difference leading to formation of a distinguishable polymer segment. Thus, at least a portion of the polymer comprises two, three, or more, preferably two or three, differentiated polymer segments arranged intramolecularly.

The following mathematical treatment of the resulting polymers is based on theoretically derived parameters that are believed to apply and demonstrate that, especially in two or more steady-state, continuous reactors or zones connected in series, having differing polymerization conditions to which the growing polymer is exposed, the block lengths of the polymer being formed in each reactor or zone will conform to a most probable distribution, derived in the following manner, wherein pi is the probability of polymer propagation in a reactor with respect to block sequences from catalyst i. The theoretical treatment is based on standard assumptions and methods known in the art and used in predicting the effects of polymerization kinetics on molecular architecture, including the use of mass action reaction rate expressions that are not affected by chain or block lengths, and the assumption that polymer chain growth is completed in a very short time compared to the mean reactor residence time. Such methods have been previously disclosed in W. H. Ray, J. Macromol. Sci., Rev. Macromol. Chem., C8, 1 (1972) and A. E. Hamielec and J. F. MacGregor, "Polymer Reaction Engineering", K. H. Reichert and W. Geisler, Eds., Hanser, Munich, 1983. In addition, it is assumed that each incidence of the chain shuttling reaction in a given reactor results in the formation of a single polymer block, whereas transfer of the chain shuttling agent terminated polymer to a different reactor or zone and exposure to different polymerization conditions results in formation of a different block. For catalyst i, the fraction of sequences of length n being produced in a reactor is given by Xi[n], where n is an integer from 1 to infinity representing the total number of monomer units in the block.

$$Xi[n] = (1 - pi)\, pi(n-1) \quad \text{most probable distribution of block lengths}$$

$$Ni = \frac{1}{1 - pi} \quad \text{number average block length}$$

If more than one catalyst is present in a reactor or zone, each catalyst has a probability of propagation (pi) and therefore has a unique average block length and distribution for polymer being made in that reactor or zone. In a most preferred embodiment the probability of propagation is defined as:

$$pi = \frac{Rp[i]}{Rp[i] + Rt[i] + Rs[i] + [Ci]}$$

for each catalyst i={1, 2 . . . }, where,
Rp[i]=Local rate of monomer consumption by catalyst i, (moles/L/time),
Rt[i]=Total rate of chain transfer and termination for catalyst i, (moles/L/time), and
Rs[i]=Local rate of chain shuttling with dormant polymer, (moles/L/time).

For a given reactor the polymer propagation rate, Rp[i], is defined using an apparent rate constant, $\overline{kpi}$, multiplied by a total monomer concentration, [M], and multiplied by the local concentration of catalyst i, [Ci], as follows:

$$Rp[i]=\overline{kpi}[M][Ci]$$

The chain transfer, termination, and shuttling rate is determined as a function of chain transfer to hydrogen (H2), beta hydride elimination, and chain transfer to chain shuttling agent (CSA). The quantities [H2] and [CSA] are molar concentrations and each subscripted k value is a rate constant for the reactor or zone:

$$Rt[i]=kH2i[H2][Ci]+k\beta i[Ci]+kai[CSA][Ci]$$

Dormant polymer chains are created when a polymer moiety transfers to a CSA and all CSA moieties that react are assumed to each be paired with a dormant polymer chain. The rate of chain shuttling of dormant polymer with catalyst i is given as follows, where [CSAf] is the feed concentration of CSA, and the quantity ([CSAf]−[CSA]) represents the concentration of dormant polymer chains:

$$Rs[i]=kai[Ci]([CSAf]-[CSA])$$

As a result of the foregoing theoretical treatment, it may be seen that the overall block length distribution for each block of the resulting block copolymer is a sum of the block length distribution given previously by Xi[n], weighted by the local polymer production rate for catalyst i. This means that a polymer made under at least two different polymer forming conditions will have at least two distinguishable blocks or segments each possessing a most probable block length distribution.

Monomers

Suitable monomers for use in preparing the copolymers of the present invention include any addition polymerizable monomer, preferably any olefin or diolefin monomer, more preferably any α-olefin, and most preferably ethylene and at least one copolymerizable comonomer, propylene and at least one copolymerizable comonomer having from 4 to 20 carbons, or 1-butene and at least one copolymerizable comonomer having 2 or from 5 to 20 carbons, 4-methyl-1-pentene and at least one different copolymerizable comonomer having from 4 to 20 carbons. Preferably, the copolymers comprise propylene and ethylene. Examples of suitable monomers include straight-chain or branched α-olefins of 2 to 30, preferably 2 to 20 carbon atoms, such as ethylene, propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene and 1-eicosene; cycloolefins of 3 to 30, preferably 3 to 20 carbon atoms, such as cyclopentene, cycloheptene, norbornene, 5-methyl-2-norbornene, tetracyclododecene, and 2-methyl-1,4,5,8-dimethano-1,2,3,4,4a,5,8,8a-octahydronaphthalene; di- and poly-olefins, such as butadiene, isoprene, 4-methyl-1,3-pentadiene, 1,3-pentadiene, 1,4-pentadiene, 1,5-hexadiene, 1,4-hexadiene, 1,3-hexadiene, 1,3-octadiene, 1,4-octadiene, 1,5-octadiene, 1,6-octadiene, 1,7-octadiene, ethylidene norbornene, vinyl norbornene, dicyclopentadiene, 7-methyl-1,6-octadiene, 4-ethylidene-8-methyl-1,7-nonadiene, and 5,9-dimethyl-1,4,8-decatriene; aromatic vinyl compounds such as mono- or poly-alkylstyrenes (including styrene, o-methylstyrene, m-methylstyrene, p-methylstyrene, o,p-dimethylstyrene, o-ethylstyrene, m-ethylstyrene and p-ethylstyrene), and functional group-containing derivatives, such as methoxystyrene, ethoxystyrene, vinylbenzoic acid, methyl vinylbenzoate, vinylbenzyl acetate, hydroxystyrene, o-chlorostyrene, p-chloro styrene, divinylbenzene, 3-phenylpropene, 4-phenylpropene and α-methylstyrene, vinylchloride, 1,2-difluoroethylene, 1,2-dichloroethylene, tetrafluoroethylene, and 3,3,3-trifluoro-1-propene, provided the monomer is polymerizable under the conditions employed.

Preferred monomers or mixtures of monomers for use in combination with at least one CSA herein include ethylene; propylene; mixtures of ethylene with one or more monomers selected from the group consisting of propylene, 1-butene, 1-hexene, 4-methyl-1-pentene, 1-octene, and styrene; and mixtures of ethylene, propylene and a conjugated or nonconjugated diene.

Catalysts and Chain Shuttling Agents

Suitable catalysts and catalyst precursors for use in the present invention include metal complexes such as disclosed in WO2005/090426, in particular, those disclosed starting on page 20, line 30 through page 53, line 20, which is herein incorporated by reference. Suitable catalysts are also disclosed in US 2006/0199930; US 2007/0167578; US 2008/

0311812; U.S. Pat. No. 7,355,089 B2; or WO 2009/012215, which are herein incorporated by reference with respect to catalysts.

Particularly preferred catalysts are those of the following formula:

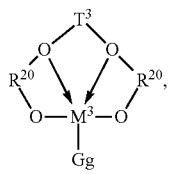

where:
$R^{20}$ is an aromatic or inertly substituted aromatic group containing from 5 to 20 atoms not counting hydrogen, or a polyvalent derivative thereof;
$T^3$ is a hydrocarbylene or silane group having from 1 to 20 atoms not counting hydrogen, or an inertly substituted derivative thereof;
$M^3$ is a Group 4 metal, preferably zirconium or hafnium;
G is an anionic, neutral or dianionic ligand group; preferably a halide, hydrocarbyl or dihydrocarbylamide group having up to 20 atoms not counting hydrogen;
g is a number from 1 to 5 indicating the number of such G groups; and
bonds and electron donative interactions are represented by lines and arrows respectively.

Preferably, such complexes correspond to the formula:

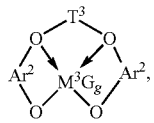

wherein: $T^3$ is a divalent bridging group of from 2 to 20 atoms not counting hydrogen, preferably a substituted or unsubstituted, $C_{3-6}$ alkylene group; and
$Ar^2$ independently each occurrence is an arylene or an alkyl- or aryl-substituted arylene group of from 6 to 20 atoms not counting hydrogen;
$M^3$ is a Group 4 metal, preferably hafnium or zirconium;
G independently each occurrence is an anionic, neutral or dianionic ligand group;
g is a number from 1 to 5 indicating the number of such X groups; and
electron donative interactions are represented by arrows.
Preferred examples of metal complexes of foregoing formula include the following compounds:

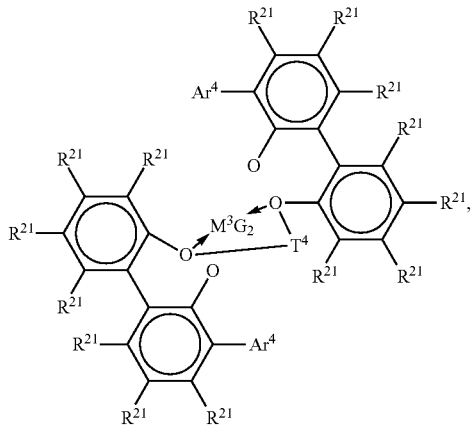

where $M^3$ is Hf or Zr;
$Ar^4$ is $C_{6-20}$ aryl or inertly substituted derivatives thereof, especially 3,5-di(isopropyl)phenyl, 3,5-di(isobutyl)phenyl, dibenzo-1H-pyrrole-1-yl, or anthracen-5-yl, and
$T^4$ independently each occurrence comprises a $C_{3-6}$ alkylene group, a $C_{3-6}$ cycloalkylene group, or an inertly substituted derivative thereof;
$R^{21}$ independently each occurrence is hydrogen, halo, hydrocarbyl, trihydrocarbylsilyl, or trihydrocarbylsilylhydrocarbyl of up to 50 atoms not counting hydrogen; and
G, independently each occurrence is halo or a hydrocarbyl or trihydrocarbylsilyl group of up to 20 atoms not counting hydrogen, or 2 G groups together are a divalent derivative of the foregoing hydrocarbyl or trihydrocarbylsilyl groups.

Especially preferred are compounds of the formula:

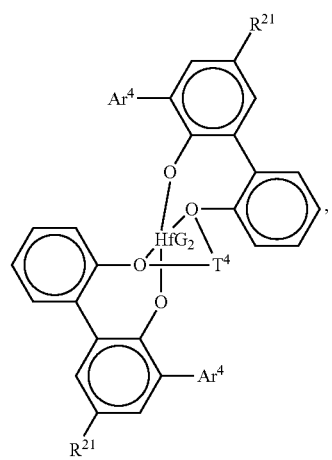

wherein $Ar^4$ is 3,5-di(isopropyl)phenyl, 3,5-di(isobutyl)phenyl, dibenzo-1H-pyrrole-1-yl, or anthracen-5-yl,
$R^{21}$ is hydrogen, halo, or $C_{1-4}$ alkyl, especially methyl
$T^4$ is propan-1,3-diyl or butan-1,4-diyl, and
G is chloro, methyl or benzyl.

Other suitable metal complexes are those of the formula:

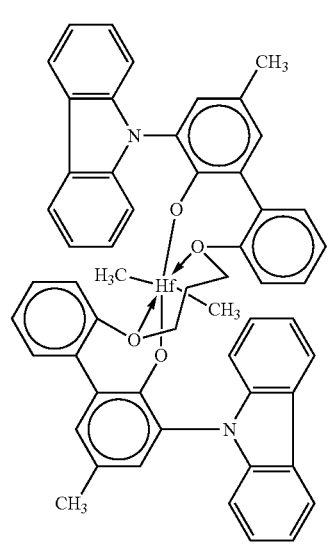

or

-continued

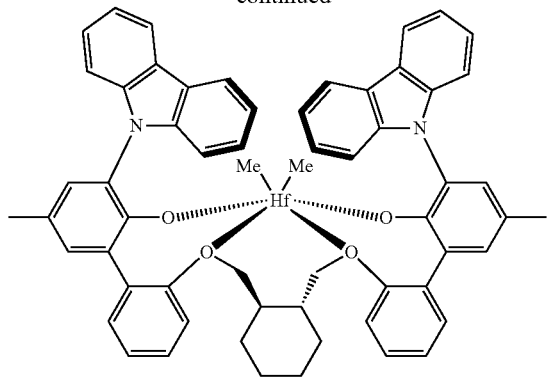

The foregoing polyvalent Lewis base complexes are conveniently prepared by standard metallation and ligand exchange procedures involving a source of the Group 4 metal and the neutral polyfunctional ligand source. In addition, the complexes may also be prepared by means of an amide elimination and hydrocarbylation process starting from the corresponding Group 4 metal tetraamide and a hydrocarbylating agent, such as trimethylaluminum. Other techniques may be used as well. These complexes are known from the disclosures of, among others, U.S. Pat. Nos. 6,320,005, 6,103,657, 6,953,764; International Publication Nos WO 02/38628 and WO 03/40195.

Suitable co-catalysts are those disclosed in WO2005/090426, in particular, those disclosed on page 54, line 1 to page 60, line 12, which is herein incorporated by reference.

Suitable chain shuttling agents are those disclosed in WO2005/090426, in particular, those disclosed on page 19, line 21 through page 20 line 12, which is herein incorporated by reference. Particularly preferred chain shuttling agents are dialkyl zinc compounds.

Block Composite Polymer Product

Utilizing the present process, novel block composite polymers are readily prepared. Preferably, the block composite polymers comprise propylene, 1-butene or 4-methyl-1-pentene and one or more comonomers. Preferably, the block polymers of the block composites comprise in polymerized form propylene and ethylene and/or one or more $C_{4-20}$ α-olefin comonomers, and/or one or more additional copolymerizable comonomers or they comprise 4-methyl-1-pentene and ethylene and/or one or more $C_{4-20}$ α-olefin comonomers, or they comprise 1-butene and ethylene, propylene and/or one or more $C_{5-20}$ α-olefin comonomers and/or one or more additional copolymerizable comonomers. Additional suitable comonomers are selected from diolefins, cyclic olefins, and cyclic diolefins, halogenated vinyl compounds, and vinylidene aromatic compounds.

Comonomer content in the resulting block composite polymers may be measured using any suitable technique, with techniques based on nuclear magnetic resonance (NMR) spectroscopy preferred. It is highly desirable that some or all of the polymer blocks comprise amorphous or relatively amorphous polymers such as copolymers of propylene, 1-butene or 4-methyl-1-pentene and a comonomer, especially random copolymers of propylene, 1-butene or 4-methyl-1-pentene with ethylene, and any remaining polymer blocks (hard segments), if any, predominantly comprise propylene, 1-butene or 4-methyl-1-pentene in polymerized form. Preferably such segments are highly crystalline or stereospecific polypropylene, polybutene or poly-4-methyl-1-pentene, especially isotactic homopolymers.

Further preferably, the block copolymers of the invention comprise from 10 to 90 percent crystalline or relatively hard segments, preferably from 5 to 50 percent, and 90 to 10 percent amorphous or relatively amorphous segments (soft segments). Within the soft segments, the mole percent comonomer may range from 5 to 90 mole percent, preferably from 10 to 60 mole percent. In the case wherein the comonomer is ethylene, it is preferably present in an amount of 10 wt % to 75 wt %, preferably from 10 wt % to 70 wt %, or 10 mol % to 70 mol % ethylene, preferably 30 mol % to 75 mol % and more preferably 33 mol % to 65 mol %. The block composites may have 5 wt % to 50 wt % hard blocks and 95 wt % to 50 wt % soft blocks.

Preferably, the copolymers comprise hard segments that are 80 wt % to 100 wt % propylene. The hard segments can be greater than 90 wt %, preferably greater than 95 wt % and more preferably greater than 98 wt % propylene.

The block composite polymers of the invention may be differentiated from conventional, random copolymers, physical blends of polymers, and block copolymers prepared via sequential monomer addition. The block composites may be differentiated from random copolymers by characteristics such as higher melting temperatures for a comparable amount of comonomer, block composite index, as described below; from a physical blend by characteristics such as block composite index, better tensile strength, improved fracture strength, finer morphology, improved optics, and greater impact strength at lower temperature; from block copolymers prepared by sequential monomer addition by molecular weight distribution, rheology, shear thinning, rheology ratio, and in that there is block polydispersity.

In some embodiments, the block composites of the invention have a Block Composite Index (BCI), as defined below, that is greater than zero but less than about 0.4 or from about 0.1 to about 0.3. In other embodiments, BCI is greater than about 0.4 and up to about 1.0. Additionally, the BCI can be in the range of from about 0.4 to about 0.7, from about 0.5 to about 0.7, or from about 0.6 to about 0.9. In some embodiments, BCI is in the range of from about 0.3 to about 0.9, from about 0.3 to about 0.8, or from about 0.3 to about 0.7, from about 0.3 to about 0.6, from about 0.3 to about 0.5, or from about 0.3 to about 0.4. In other embodiments, BCI is in the range of from about 0.4 to about 1.0, from about 0.5 to about 1.0, or from about 0.6 to about 1.0, from about 0.7 to about 1.0, from about 0.8 to about 1.0, or from about 0.9 to about 1.0.

The block composites preferably have a Tm greater than 100° C., preferably greater than 120° C., and more preferably greater than 125° C. Preferably the MFR of the block composite is from 0.1 to 1000 dg/min, more preferably from 0.1 to 50 dg/min and more preferably from 0.5 to 50 dg/min and may also be from 0.5 to 30 dg/min.

The block composites preferably have domains in the dispersed phase that are less than 300 nm, preferably less than 200 nm, more preferably less than 100 nm; the block composite may have domains from 0.05 μm to 300 nm, from 0.1 μm to 100 nm or 0.5 μm to 100 nm.

Other desirable compositions according to the present invention are elastomeric block copolymers of propylene, 1-butene or 4-methyl-1-pentene with ethylene, and optionally one or more α-olefins or diene monomers. Preferred α-olefins for use in this embodiment of the present invention are designated by the formula $CH_2=CHR^*$, where $R^*$ is a linear or branched alkyl group of from 1 to 12 carbon atoms. Examples of suitable α-olefins include, but are not limited to isobutylene, 1-butene, 1-pentene, 1-hexene, 4-methyl-1-pentene (when copolymerized with propylene), and 1-octene. Suitable dienes for use in preparing such polymers, especially multi-block EPDM type polymers include conjugated or non-conjugated, straight or branched chain-, cyclic- or polycyclic-dienes containing from 4 to 20 carbons. Preferred dienes include 1,4-pentadiene, 1,4-hexadiene, 5-ethylidene-2-norbornene, dicyclopentadiene, cyclohexadiene, and 5-butylidene-2-norbornene. A particularly preferred diene is 5-ethylidene-2-norbornene. The resulting product may comprise isotactic homopolymer segments alternating with elastomeric copolymer segments, made in situ during the polymerization. Preferably, the product may be comprised solely of the elastomeric block copolymer of propylene, 1-butene or 4-methyl-1-pentene with one or more comonomers, especially ethylene.

Because the diene containing polymers contain alternating segments or blocks containing greater or lesser quantities of the diene (including none) and α-olefin (including none), the total quantity of diene and α-olefin may be reduced without loss of subsequent polymer properties. That is, because the diene and α-olefin monomers are preferentially incorporated into one type of block of the polymer rather than uniformly or randomly throughout the polymer, they are more efficiently utilized and subsequently the crosslink density of the polymer can be better controlled. Such crosslinkable elastomers and the cured products have advantaged properties, including higher tensile strength and better elastic recovery.

Further preferably, the block composites of this embodiment of the invention have a weight average molecular weight (Mw) from 10,000 to about 2,500,000, preferably from 35000 to about 1,000,000 and more preferably from 50,000 to about 300,000, preferably from 50,000 to about 200,000.

The polymers of the invention may be oil extended up to 95 wt % oil, from 5 to about 95 percent, preferably from 20 to 80 percent, more preferably from 30 to 70 percent, based on total composition weight, of a processing oil. Suitable oils include any oil that is conventionally used in manufacturing extended EPDM rubber formulations. Examples include both naphthenic- and paraffinic-oils, with paraffinic oils being preferred.

Additional components of the present formulations usefully employed according to the present invention include various other ingredients in amounts that do not detract from the properties of the resultant composition. These ingredients include, but are not limited to, activators such as calcium or magnesium oxide; fatty acids such as stearic acid and salts thereof; fillers and reinforcers such as calcium or magnesium carbonate, silica, and aluminum silicates; plasticizers such as dialkyl esters of dicarboxylic acids; antidegradants; softeners; waxes; and pigments.

Preparation of the Polymer Blends

The ingredients of the polymer blends, i.e., the block composite, the polyolefin and the optional additives, can be mixed or blended using methods known to a person of ordinary skill in the art, preferably methods that can provide a substantially homogeneous distribution of the polyolefin and/or the additives in the ethylene/α-olefin interpolymer. Non-limiting examples of suitable blending methods include melt blending, solvent blending, extruding, and the like.

Suitable polyolefins include but are not limited to polyethylenes, such as LLDPE, HDPE, LDPE or random ethylene interpolymers; polypropylenes, such as iPP, PP homopolymer and RCPs; and olefin block copolymers. The olefin block copolymers comprise polymerized units of ethylene and α-olefin, wherein the polymer is characterized by an average block index greater than zero and up to about 1.0 and a molecular weight distribution, $M_w/M_n$, greater than about 1.3. The olefin block copolymers may also comprise polymerized units of ethylene and α-olefin, wherein the average block index is greater than 0 but less than about 0.5 and a molecular weight distribution, $M_w/M_n$, greater than about 1.3. Preferably, the olefin block copolymer is a linear, multi-block copolymer with at least three blocks. Also preferably, the ethylene content in the interpolymer is at least 50 mole percent. These are described in and may be produced via polymerization techniques as illustrated in, for example, U.S. Pat. No. 7,608,668 B2, which is herein incorporated by reference. Another type of olefin block copolymer that may be used are those referred to as "mesophase separated". These mesodomains can take the form of spheres, cylinders, lamellae, or other morphologies known for block copolymers. The narrowest dimension of a domain, such as perpendicular to the plane of lamellae, is generally greater than about 40 nm in the mesophase separated block copolymers of the instant invention. Examples of these polymers may be found in, for example, International Publication Nos. WO/2009/097560, WO/2009/097565, WO/2009/097525, WO/2009/097529, WO/2009/097532, and WO/2009/097535, all of which are herein incorporated by reference. The polyolefin may be present in an amount of 0-100 phr.

In some embodiments, the ingredients of the polymer blends are melt blended by a method as described by Guerin et al. in U.S. Pat. No. 4,152,189. First, all solvents, if there are any, are removed from the ingredients by heating to an appropriate elevated temperature of about 100° C. to about 200° C. or about 150° C. to about 175° C. at a pressure of about 5 torr (667 Pa) to about 10 torr (1333 Pa). Next, the ingredients are weighed into a vessel in the desired proportions and the polymer blend is formed by heating the contents of the vessel to a molten state while stirring.

In other embodiments, the ingredients of the polymer blends are processed using solvent blending. First, the ingredients of the desired polymer blend are dissolved in a suitable solvent and the mixture is then mixed or blended. Next, the solvent is removed to provide the polymer blend.

In further embodiments, physical blending devices that provide dispersive mixing, distributive mixing, or a combination of dispersive and distributive mixing can be useful in preparing homogenous blends. Both batch and continuous methods of physical blending can be used. Non-limiting examples of batch methods include those methods using BRABENDER® mixing equipments (e.g., BRABENDER PREP CENTER®, available from C. W. Brabender Instruments, Inc., South Hackensack, N.J.) or BANBURY® internal mixing and roll milling (available from Farrel Company, Ansonia, Conn.) equipment. Non-limiting examples of continuous methods include single screw extruding, twin screw extruding, disk extruding, reciprocating single screw extruding, and pin barrel single screw extruding. In some embodiments, the additives can be added into an extruder through a feed hopper or feed throat during the extrusion of the ethylene/α-olefin interpolymer, the polyolefin or the polymer blend. The mixing or blending of polymers by extrusion has been described in C. Rauwendaal, "Polymer Extrusion", Hanser Publishers, New York, N.Y., pages 322-334 (1986), which is incorporated herein by reference.

When one or more additives are required in the polymer blends, the desired amounts of the additives can be added in one charge or multiple charges to the ethylene/α-olefin interpolymer, the polyolefin or the polymer blend. Furthermore, the addition can take place in any order. In some embodiments, the additives are first added and mixed or blended with the ethylene/α-olefin interpolymer and then the additive-containing interpolymer is blended with the polyolefin. In other embodiments, the additives are first added and mixed or blended with the polyolefin and then the additive-containing polyolefin is blended with the ethylene/α-olefin interpolymer. In further embodiments, the ethylene/α-olefin interpolymer is blended with the polyolefin first and then the additives are blended with the polymer blend. Polymer blends can also be performed at the fabrication equipment as dry blends (no pre-compounding required).

Alternatively, master batches containing high concentrations of the additives can be used. In general, master batches can be prepared by blending either the ethylene/α-olefin interpolymer, the polyolefin or the polymer blend with high concentrations of additives. The master batches can have additive concentrations from about 1 to about 50 wt %, from about 1 to about 40 wt %, from about 1 to about 30 wt %, or from about 1 to about 20 wt % of the total weight of the polymer blend. The master batches can then be added to the polymer blends in an amount determined to provide the desired additive concentrations in the end products. In some embodiments, the master batch contains a slip agent, an anti-blocking agent, a plasticizer, an antioxidant, a UV stabilizer, a colorant or pigment, a filler, a lubricant, an antifogging agent, a flow aid, a coupling agent, a cross-linking agent, a nucleating agent, a surfactant, a solvent, a flame retardant, an antistatic agent, or a combination thereof. In other embodiment, the master batch contains a slip agent, an anti-blocking agent or a combination thereof. In other embodiment, the master batch contains a slip agent.

Preferably the blends have a dispersed morphology with the narrowest dimension being less than 300 nm in width, diameter or height, preferably less than 200 nm, more preferably less than 100 nm; the morphologies may also be from 1 nm to 300 nm, from 10 nm to 200 nm or from 20 nm to 100 nm.

The blends may comprise 100 parts of block composite, 50-150 phr oil, 0-11 phr polyolefin and 0-200 phr filler. The compression set of the blends may be 40% to 70%. The Shore A may be 50 to 90.

Applications of the Polymer Blends

The polymer blends disclosed herein can be used to manufacture durable articles for the automotive, construction, medical, food and beverage, electrical, appliance, business machine, and consumer markets. In some embodiments, the polymer blends are used to manufacture flexible durable parts or articles selected from toys, grips, soft touch handles, bumper rub strips, floorings, auto floor mats, wheels, casters, furniture and appliance feet, tags, seals, gaskets such as static and dynamic gaskets, automotive doors, bumper fascia, grill components, rocker panels, hoses, linings, office supplies, seals, liners, diaphragms, tubes, lids, stoppers, plunger tips, delivery systems, kitchen wares, shoes, shoe bladders and shoe soles. In other embodiments, the polymer blends can be used to manufacture durable parts or articles that require a high tensile strength and low compression set. In further embodiments, the polymer blends can be used to manufacture durable parts or articles that require a high upper service temperature and low modulus.

The polymer blends can be used to prepare these durable parts or articles with known polymer processes such as extrusion (e.g., sheet extrusion and profile extrusion); molding (e.g., injection molding, rotational molding, and blow molding); fiber spinning; and blown film and cast film processes. In general, extrusion is a process by which a polymer is propelled continuously along a screw through regions of high temperature and pressure where it is melted and compacted, and finally forced through a die. The extruder can be a single screw extruder, a multiple screw extruder, a disk extruder or a ram extruder. The die can be a film die, blown film die, sheet die, pipe die, tubing die or profile extrusion die. The extrusion of polymers has been described in C. Rauwendaal, "*Polymer Extrusion*", Hanser Publishers, New York, N.Y. (1986); and M. J. Stevens, "*Extruder Principals and Operation*," Ellsevier Applied Science Publishers, New York, N.Y. (1985), both of which are incorporated herein by reference in their entirety.

Injection molding is also widely used for manufacturing a variety of plastic parts for various applications. In general, injection molding is a process by which a polymer is melted and injected at high pressure into a mold, which is the inverse of the desired shape, to form parts of the desired shape and size. The mold can be made from metal, such as steel and aluminum. The injection molding of polymers has been described in Beaumont et al., "*Successful Injection Molding: Process, Design, and Simulation*," Hanser Gardner Publications, Cincinnati, Ohio (2002), which is incorporated herein by reference in its entirety.

Molding is generally a process by which a polymer is melted and led into a mold, which is the inverse of the desired shape, to form parts of the desired shape and size. Molding can be pressureless or pressure-assisted. The molding of polymers is described in Hans-Georg Elias "*An Introduction to Plastics*," Wiley-VCH, Weinhei, Germany, pp. 161-165 (2003), which is incorporated herein by reference.

The following examples are presented to exemplify embodiments of the invention. All numerical values are approximate. When numerical ranges are given, it should be understood that embodiments outside the stated ranges may still fall within the scope of the invention. Specific details described in each example should not be construed as necessary features of the invention.

Polymerization Methods

Suitable processes useful in producing the block composites of the invention may be found, for example, in US Patent Application Publication No. 2008/0269412, published on Oct. 30, 2008, which is herein incorporated by reference. In particular, the polymerization is desirably carried out as a continuous polymerization, preferably a continuous, solution polymerization, in which catalyst components, monomers, and optionally solvent, adjuvants, scavengers, and polymerization aids are continuously supplied to one or more reactors or zones and polymer product continuously removed therefrom. Within the scope of the terms "continuous" and "continuously" as used in this context are those processes in which there are intermittent additions of reactants and removal of products at small regular or irregular intervals, so that, over time, the overall process is substantially continuous. Moreover, as previously explained, the chain shuttling agent(s) may be added at any point during the polymerization including in the first reactor or zone, at the exit or slightly before the exit of the first reactor, between the first reactor or zone and the second or any subsequent reactor or zone, or even solely to the second or any subsequent reactor or zone. Due to the difference in monomers, temperatures, pressures or other difference in polymerization conditions between at least two of the reactors or zones connected in series, polymer segments of differing composition such as comonomer content, crystallinity, density, tacticity, regio-regularity, or other chemical or physical difference, within the same molecule are formed in the different reactors or zones. The size of each segment or block is determined by continuous polymer reaction conditions, and preferably is a most probable distribution of polymer sizes.

Each reactor in the series can be operated under high pressure, solution, slurry, or gas phase polymerization conditions. In a multiple zone polymerization, all zones operate under the same type of polymerization, such as solution, slurry, or gas phase, but at different process conditions. For a solution polymerization process, it is desirable to employ homogeneous dispersions of the catalyst components in a liquid diluent in which the polymer is soluble under the polymerization conditions employed. One such process utilizing an extremely fine silica or similar dispersing agent to produce such a homogeneous catalyst dispersion wherein normally either the metal complex or the cocatalyst is only poorly soluble is disclosed in U.S. Pat. No. 5,783,512. A high pressure process is usually carried out at temperatures from 100° C. to 400° C. and at pressures above 500 bar (50 MPa). A slurry process typically uses an inert hydrocarbon diluent and temperatures of from 0° C. up to a temperature just below the temperature at which the resulting polymer becomes substantially soluble in the inert polymerization medium. Preferred temperatures in a slurry polymerization are from 30° C., preferably from 60° C. up to 115° C., preferably up to 100° C. Pressures typically range from atmospheric (100 kPa) to 500 psi (3.4 MPa).

In all of the foregoing processes, continuous or substantially continuous polymerization conditions are preferably employed. The use of such polymerization conditions, especially continuous, solution polymerization processes, allows the use of elevated reactor temperatures which results in the economical production of the present block copolymers in high yields and efficiencies.

The catalyst may be prepared as a homogeneous composition by addition of the requisite metal complex or multiple complexes to a solvent in which the polymerization will be conducted or in a diluent compatible with the ultimate reaction mixture. The desired cocatalyst or activator and, optionally, the shuttling agent may be combined with the catalyst composition either prior to, simultaneously with, or after combination of the catalyst with the monomers to be polymerized and any additional reaction diluent.

At all times, the individual ingredients as well as any active catalyst composition must be protected from oxygen, moisture and other catalyst poisons. Therefore, the catalyst components, shuttling agent and activated catalysts must be prepared and stored in an oxygen and moisture free atmosphere, preferably under a dry, inert gas such as nitrogen.

Without limiting in any way the scope of the invention, one means for carrying out such a polymerization process is as follows. In one or more well stirred tank or loop reactors operating under solution polymerization conditions, the monomers to be polymerized are introduced continuously together with any solvent or diluent at one part of the reactor. The reactor contains a relatively homogeneous liquid phase composed substantially of monomers together with any solvent or diluent and dissolved polymer. Preferred solvents include $C_{4-10}$ hydrocarbons or mixtures thereof, especially alkanes such as hexane or mixtures of alkanes, as well as one or more of the monomers employed in the polymerization. Examples of suitable loop reactors and a variety of suitable operating conditions for use therewith, including the use of multiple loop reactors, operating in series, are found in U.S. Pat. Nos. 5,977,251, 6,319,989 and 6,683,149.

Catalyst along with cocatalyst and optionally chain shuttling agent are continuously or intermittently introduced in the reactor liquid phase or any recycled portion thereof at a minimum of one location. The reactor temperature and pressure may be controlled by adjusting the solvent/monomer ratio, the catalyst addition rate, as well as by use of cooling or heating coils, jackets or both. The polymerization rate is controlled by the rate of catalyst addition. The content of a given monomer in the polymer product is influenced by the ratio of monomers in the reactor, which is controlled by manipulating the respective feed rates of these components to the reactor. The polymer product molecular weight is controlled, optionally, by controlling other polymerization variables such as the temperature, monomer concentration, or by the previously mentioned chain shuttling agent, or a chain terminating agent such as hydrogen, as is well known in the art. Connected to the discharge of the reactor, optionally by means of a conduit or other transfer means, is a second reactor, such that the reaction mixture prepared in the first reactor is discharged to the second reactor without substantially termination of polymer growth. Between the first and second reactors, a differential in at least one process condition is established. Preferably for use in formation of a copolymer of two or more monomers, the difference is the presence or absence of one or more comonomers or a difference in comonomer concentration. Additional reactors, each arranged in a manner similar to the second reactor in the series may be provided as well. Upon exiting the last reactor of the series, the effluent is contacted with a catalyst kill agent such as water, steam or an alcohol or with a coupling agent.

The resulting polymer product is recovered by flashing off volatile components of the reaction mixture such as residual monomers or diluent at reduced pressure, and, if necessary, conducting further devolatilization in equipment such as a devolatilizing extruder. In a continuous process the mean residence time of the catalyst and polymer in the reactor generally is from 5 minutes to 8 hours, and preferably from 10 minutes to 6 hours.

Alternatively, the foregoing polymerization may be carried out in a plug flow reactor with a monomer, catalyst, shuttling agent, temperature or other gradient established between differing zones or regions thereof, optionally accompanied by separated addition of catalysts and/or chain shuttling agent, and operating under adiabatic or non-adiabatic polymerization conditions.

The catalyst composition may also be prepared and employed as a heterogeneous catalyst by adsorbing the requisite components on an inert inorganic or organic particulated solid, as previously disclosed. In a preferred embodiment, a heterogeneous catalyst is prepared by co-precipitating the metal complex and the reaction product of an inert inorganic compound and an active hydrogen containing activator, especially the reaction product of a tri ($C_{1-4}$ alkyl) aluminum compound and an ammonium salt of a hydroxyaryltris(pentafluorophenyl)borate, such as an ammonium salt of (4-hydroxy-3,5-ditertiarybutylphenyl)tris(pentafluorophenyl)borate. When prepared in heterogeneous or supported form, the catalyst composition may be employed in a slurry or a gas phase polymerization. As a practical limitation, slurry polymerization takes place in liquid diluents in which the polymer product is substantially insoluble. Preferably, the diluent for slurry polymerization is one or more hydrocarbons with less than 5 carbon atoms. If desired, saturated hydrocarbons such as ethane, propane or butane may be used in whole or part as the diluent. As with a solution polymerization, the α-olefin comonomer or a mixture of different α-olefin monomers may be used in whole or part as the diluent. Most preferably at least a major part of the diluent comprises the α-olefin monomer or monomers to be polymerized.

Testing Methods

The overall composition of each resin is determined by DSC, NMR, GPC, DMS, and TEM morphology. Xylene fractionation is further used to estimate the yield of block copolymer.

Differential Scanning Calorimetry (DSC)

Differential Scanning Calorimetry is performed on a TA Instruments Q1000 DSC equipped with an RCS cooling accessory and an auto sampler. A nitrogen purge gas flow of 50 ml/min is used. The sample is pressed into a thin film and melted in the press at about 190° C. and then air-cooled to room temperature (25° C.). About 3-10 mg of material is then cut, accurately weighed, and placed in a light aluminum pan (ca 50 mg) which is later crimped shut. The thermal behavior of the sample is investigated with the following temperature profile: the sample is rapidly heated to 190° C. and held isothermal for 3 minutes in order to remove any previous thermal history. The sample is then cooled to −90° C. at 10° C./min cooling rate and held at −90° C. for 3 minutes. The sample is then heated to 150° C. at 10° C./min heating rate. The cooling and second heating curves are recorded.

$^{13}$C Nuclear Magnetic Resonance (NMR)

Sample Preparation

The samples are prepared by adding approximately 2.7 g of a 50/50 mixture of tetrachloroethane-d2/orthodichlorobenzene that is 0.025M in chromium acetylacetonate (relaxation agent) to 0.21 g sample in a 10 mm NMR tube. The samples are dissolved and homogenized by heating the tube and its contents to 150° C.

Data Acquisition Parameters

The data is collected using a Bruker 400 MHz spectrometer equipped with a Bruker Dual DUL high-temperature Cryo-Probe. The data is acquired using 320 transients per data file, a 7.3 sec pulse repetition delay (6 sec delay+1.3 sec acq. time), 90 degree flip angles, and inverse gated decoupling with a sample temperature of 125° C. All measurements are made on non spinning samples in locked mode. Samples are homogenized immediately prior to insertion into the heated (130° C.) NMR Sample changer, and are allowed to thermally equilibrate in the probe for 15 minutes prior to data acquisition.

Gel Permeation Chromatography (GPC)

The gel permeation chromatographic system consists of either a Polymer Laboratories Model PL-210 or a Polymer Laboratories Model PL-220 instrument. The column and carousel compartments are operated at 140° C. Three Polymer Laboratories 10-micron Mixed-B columns are used. The solvent is 1,2,4 trichlorobenzene. The samples are prepared at a concentration of 0.1 grams of polymer in 50 milliliters of solvent containing 200 ppm of butylated hydroxytoluene (BHT). Samples are prepared by agitating lightly for 2 hours at 160° C. The injection volume used is 100 microliters and the flow rate is 1.0 ml/minute.

Calibration of the GPC column set is performed with 21 narrow molecular weight distribution polystyrene standards with molecular weights ranging from 580 to 8,400,000, arranged in 6 "cocktail" mixtures with at least a decade of separation between individual molecular weights. The standards are purchased from Polymer Laboratories (Shropshire, UK). The polystyrene standards are prepared at 0.025 grams in 50 milliliters of solvent for molecular weights equal to or greater than 1,000,000, and 0.05 grams in 50 milliliters of solvent for molecular weights less than 1,000,000. The polystyrene standards are dissolved at 80° C. with gentle agitation for 30 minutes. The narrow standards mixtures are run first and in order of decreasing highest molecular weight component to minimize degradation. The polystyrene standard peak molecular weights are converted to polyethylene molecular weights using the following equation (as described in Williams and Ward, *J. Polym. Sci., Polym. Let.*, 6, 621 (1968)): $M_{polypropylene}=0.645(M_{polystyrene})$.

Polypropylene equivalent molecular weight calculations are performed using Viscotek TriSEC software Version 3.0.

Fast-Temperature Rising Elution Fractionation (F-TREF).

In F-TREF analysis, the composition to be analyzed is dissolved in ortho-dichlorobenzene and allowed to crystallize in a column containing an inert support (stainless steel shot) by slowly reducing the temperature to 30° C. (at a preferred rate of 0.4° C./min). The column is equipped with an infra-red detector. An F-TREF chromatogram curve is then generated by eluting the crystallized polymer sample from the column by slowly increasing the temperature of the eluting solvent (o-dichlorobenzene) from 30 to 140° C. (at a preferred rate of 1.5° C./min).

High Temperature Liquid Chromatography (HTLC)

HTLC is performed according to the methods disclosed in US Patent Application Publication No. 2010-0093964 and U.S. patent application Ser. No. 12/643,111, filed Dec. 21, 2009, both of which are herein incorporated by reference. Samples are analyzed by the methodology described below.

A Waters GPCV2000 high temperature SEC chromatograph was reconfigured to build the HT-2DLC instrumentation. Two Shimadzu LC-20AD pumps were connected to the injector valve in GPCV2000 through a binary mixer. The first dimension (D1) HPLC column was connected between the injector and a 10-port switch valve (Valco Inc). The second dimension (D2) SEC column was connected between the 10-port valve and LS (Varian Inc.), IR (concentration and composition), RI (refractive index), and IV (intrinsic viscosity) detectors. RI and IV were built-in detector in GPCV2000. The IRS detector was provided by PolymerChar, Valencia, Spain.

Columns:

The D1 column was a high temperature Hypercarb graphite column (2.1×100 mm) purchased from Thermo Scientific. The D2 column was a PLRapid-H column purchased from Varian (10×100 mm).

Reagents:

HPLC grade trichlorobenzene (TCB) was purchased from Fisher Scientific. 1-Decanol and decane were from Aldrich. 2,6-Di-tert-butyl-4-methylphenol (Ionol) was also purchased from Aldrich.

Sample Preparation:

0.01-0.15 g of polyolefin sample was placed in a 10-mL Waters autosampler vial. 7-mL of either 1-decanol or decane with 200 ppm Ionol was added to the vial afterwards. After sparging helium to the sample vial for about 1 min, the sample vial was put on a heated shaker with temperature set at 160° C. The dissolution was done by shaking the vial at the temperature for 2 hr. The vial was then transferred to the autosampler for injection. Please note that the actual volume of the solution was more than 7 mL due to the thermal expansion of the solvent.

HT-2DLC:

The D1 flow rate was at 0.01 mL/min. The composition of the mobile phase was 100% of the weak eluent (1-decanol or decane) for the first 10 min of the run. The composition was then increased to 60% of strong eluent (TCB) in 489 min. The data were collected for 489 min as the duration of the raw chromatogram. The 10-port valve switched every three minutes yielding 489/3=163 SEC chromatograms. A post-run gradient was used after the 489 min data acquisition time to clean and equilibrate the column for the next run:

Clean Step:
1. 490 min: flow=0.01 min; //Maintain the constant flow rate of 0.01 mL/min from 0-490 min.
2. 491 min: flow=0.20 min; //Increase the flow rate to 0.20 mL/min.

3. 492 min: % B=100; //Increase the mobile phase composition to 100% TCB
4. 502 min: % B=100; //Wash the column using 2 mL of TCB Equilibrium Step:
5. 503 min: % B=0; //Change the mobile phase composition to 100% of 1-decanol or decane
6. 513 min: % B=0; //Equilibrate the column using 2 mL of weak eluent
7. 514 min: flow=0.2 mL/min; //Maintain the constant flow of 0.2 mL/min from 491-514 min
8. 515 min: flow=0.01 mL/min; //Lower the flow rate to 0.01 mL/min.

After step 8, the flow rate and mobile phase composition were the same as the initial conditions of the run gradient.

The D2 flow rate was at 2.51 mL/min. Two 60 μL loops were installed on the 10-port switch valve. 30-μL of the eluent from D1 column was loaded onto the SEC column with every switch of the valve.

The IR, LS15 (light scattering signal at 15°), LS90 (light scattering signal at 90°), and IV (intrinsic viscosity) signals were collected by EZChrom through a SS420X analogue-to-digital conversion box. The chromatograms were exported in ASCII format and imported into a home-written MATLAB software for data reduction. Using an appropriate calibration curve of polymer composition and retention volume, of polymers that are of similar nature of the hard block and soft block contained in the block composite being analyzed. Calibration polymers should be narrow in composition (both molecular weight and chemical composition) and span a reasonable molecular weight range to cover the composition of interest during the analysis. Analysis of the raw data was calculated as follows, the first dimension HPLC chromatogram was reconstructed by plotting the IR signal of every cut (from total IR SEC chromatogram of the cut) as a function of the elution volume. The IR vs. D1 elution volume was normalized by total IR signal to obtain weight fraction vs. D1 elution volume plot. The IR methyl/measure ratio was obtained from the reconstructed IR measure and IR methyl chromatograms. The ratio was converted to composition using a calibration curve of PP wt. % (by NMR) vs. methyl/measure obtained from SEC experiments. The MW was obtained from the reconstructed IR measure and LS chromatograms. The ratio was converted to MW after calibration of both IR and LS detectors using a PE standard.

The weight % of isolated PP is measured as the area that corresponds to the hard block composition based on the isolated peak and the retention volume as determined by a composition calibration curve.

Dynamic Mechanical Spectroscopy (DMS)

The dynamic mechanical measurements (loss and storage modulus vs. temperature) are measured on TA instruments ARES. The dynamic modulus measurements are performed in torsion on a solid bar of ca. 2 mm thickness, 5 mm wide and ca. 10 mm in length. The data is recorded at a constant frequency of 10 rad/s and at a heating/cooling rate of 5° C./min. The temperature sweeps are performed from −90 to 190 C at 5° C./min.

Transmission Electron Microscopy (TEM)

Polymer films are prepared by compression molding followed by fast quenching. The polymer is pre-melted at 190° C. for 1 minute at 1000 psi and then pressed for 2 minutes at 5000 psi and then quenched between chilled platens (15-20° C.) for 2 minutes.

The compression molded films are trimmed so that sections could be collected near the core of the films. The trimmed samples are cryopolished prior to staining by removing sections from the blocks at −60° C. to prevent smearing of the elastomer phases. The cryopolished blocks are stained with the vapor phase of a 2% aqueous ruthenium tetraoxide solution for 3 hrs at ambient temperature. The staining solution is prepared by weighing 0.2 gm of ruthenium (III) chloride hydrate ($RuCl_3 \times H_2O$) into a glass bottle with a screw lid and adding 10 ml of 5.25% aqueous sodium hypochlorite to the jar. The samples are placed in the glass jar using a glass slide having double sided tape. The slide is placed in the bottle in order to suspend the blocks about 1 inch above the staining solution. Sections of approximately 90 nanometers in thickness are collected at ambient temperature using a diamond knife on a Leica EM UC6 microtome and placed on 600 mesh virgin TEM grids for observation.

Image Collection—

TEM images are collected on a JEOL JEM-1230 operated at 100 kV accelerating voltage and collected on a Gatan-791 and 794 digital cameras.

Back Scattering Scanning Electron Microscopy (BS-SEM)

A small rectangular piece was cut from each of the compression molded plaques at the center so that sections could be collected parallel to the injection molding direction at the core. The pieces were trimmed and cryo-polished prior to staining by removing sections from the blocks at −120° C. to prevent smearing. The cryo-polished blocks were stained with the vapor phase of an aqueous ruthenium tetraoxide solution for 40 minutes at ambient temperature. The staining solution was prepared by weighing 0.2 gm of ruthenium (III) chloride hydrate ($RuCl3 \times H2O$) into a glass bottle with a screw lid and adding 10 ml of 5.25% aqueous sodium hypochlorite to the jar. The samples were placed in a glass jar using a glass slide having double sided tape with the skin side adhered to the tape to prevent over staining of the outer surface. The slide was placed in the bottle in order to suspend the blocks about 1 inch above the staining solution. Sections of approximately 300 nanometers in thickness were removed from the block faces at −120° C. using a histology-diamond knife on a Leica UCT microtome equipped with an FCS cryosectioning chamber. Material was removed from the blocks until non-fractures sections could be collected indicating that brittle and over stained regions of the sample had been eliminated. The cryopolished blocks were sputtered with an Iridium plasma using an Emitech K575X turbo sputter coater for 20 seconds to render them conductive for electron microscopy.

Backscatter electron images (BEI) were collected on a An FEI Nano600 scanning electron microscope operated at an accelerating voltage of 10 kV, a 5 mm working distance and spot size 5.0. Immersion mode was used with a solid state backscatter detector to capture BEI images from the core of the cryo-polished block faces.

Xylene Soluble Fractionation Analysis

A weighed amount of resin is dissolved in 200 ml o-xylene under reflux conditions for 2 hours. The solution is then cooled in a temperature controlled water bath to 25° C. to allow the crystallization of the xylene insoluble (XI) fraction. Once the solution is cooled and the insoluble fraction precipitates from the solution, the separation of the xylene soluble (XS) fraction from the xylene insoluble fraction is done by filtration through a filter paper. The remaining o-xylene solution is evaporated from the filtrate. Both XS and XI fractions are dried in a vacuum oven at 100° C. for 60 min and then weighed. Alternatively, if the solution crystallization temperature of the soft block polymer is above room temperature, the fractionation step can be carried out at a temperature 10-20° C. above the soft blocks crystallization temperature but below the hard blocks crystallization temperature. The temperature of separation can be determined by TREF or CRYSTAF measurement as described by reference, TREF and CRYSTAF technologies for Polymer Characterization, Encyclopedia of Analytical Chemistry. 2000 Issue, Pages 8074-8094. This fractionation can be carried out in a laboratory heated dissolution and filtration apparatus or a fractionation instrument such as the Preparatory mc² (available from Polymer Char, Valencia, Spain).

Hardness

Shore A hardness was measured per ASTM D2240. This test method permits hardness measurements based on either initial indentation or indentation after a specified period of time, or both. In this case a specified time of 10 second was used.

Tensile Testing

Tensile data was measured using ASTM D 1708 which is a micro-tensile method with a pull rate of 5 in/min in the flow direction of the compression molded plaque.

Compression Set

Compression set was measured according to ASTM D 395 at ambient, 40° C. and 70° C. The sample was prepared by stacking 25.4 mm diameter round discs cut from 0.125" thick compression molded plaques until a total thickness of 12.7 mm is reached.

EXAMPLES

Examples

General

Catalyst-1 ([[rel-2',2'''(1R,2R)-1,2-cylcohexanediylbis(methyleneoxy-κO)]bis[3-(9H-carbazol-9-yl)-5-methyl[1,1'-biphenyl]-2-olato-κO]](2-)]dimethyl-hafnium) and cocatalyst-1, a mixture of methyldi($C_{14-18}$alkyl)ammonium salts of tetrakis(pentafluorophenyl)borate, prepared by reaction of a long chain trialkylamine (Armeen™ M2HT, available from Akzo-Nobel, Inc.), HCl and Li[B($C_6F_5$)$_4$], substantially as disclosed in USP 5,919,9883, Ex. 2, are available from Boulder Scientific and used without further purification. CSA-1 (diethylzinc or DEZ) and modified methylalumoxane (MMAO) is purchased from Akzo Nobel and used without further purification. The solvent for the polymerization reactions is a hydrocarbon mixture (SBP 100/140) obtainable from Shell Chemical Company and purified through beds of 13-X molecular sieves prior to use.

All examples except A1, E1, U1 and Y1 have an iPP hard block. Runs B through D have a semi-crystalline, ethylene-propylene soft block containing 60-65 wt % C2 while runs F through H have an amorphous, ethylene-propylene soft block containing 40 wt % C2. With increasing alphabetical letter, the weight fraction and length of the iPP hard block is independently controlled from 30 to 60 weight percent by increasing the production rate in the reactor (in this case, reactor 2).

Examples V1, W1, X1 and Y1, Z1, AA are similar in design to B, C, D but made at different reactor conditions. The effect of higher propylene conversion and reactor temperature will be discussed later.

All examples are run with no hydrogen. The CSA concentration in Reactor 1 for all examples is 153 mmol/kg. The MMAO concentration in Reactor 2 for all examples is 6 mmol/kg.

Samples A1-D1

Inventive propylene/ethylene copolymers were prepared using two continuous stirred tank reactors (CSTR) connected in series. Each reactor is hydraulically full and set to operate at steady state conditions. Sample A1 is prepared by flowing monomers, solvent, catalyst-1, cocatalyst-1, and CSA-1 to the first reactor according to the process conditions outlined in Table 1. To prepare sample B1, the first reactor contents as described in Table 1A were flowed to a second reactor in series. Additional catalyst-1 and cocatalyst-1 were added to the second reactor, as well as a small amount of MMAO as a scavenger. Samples C1 and D1 were prepared by controlling the conditions of the two reactors as described in Table 1A and 1B.

Samples E1-AB1

Each set of diblock samples F1-H1, V1-X1, Y1-AB1 were prepared as above for examples B1-D1 but according to the process conditions outlined in Table 1A and 1B. For each set, a first reactor product (E1, U1, Y1) is prepared targeting the first block composition.

TABLE 1A

First reactor process conditions to produce diblock copolymers B1-D1, F1-H1, V1-X1, Z1-AB1.

| Example | Solvent feed (kg/hr) | Propylene feed (kg/hr) | Ethylene feed (Kg/Hr) | Temp ° C. | Catalyst conc (mmol/Kg) | Catalyst sol. flow (g/hr) | Cocatalyst conc. (mmol/kg) | Cocatalyst sol. Flow (g/hr) | CSA flow (g/hr) | C3 conversion (%) | Calculated split (%)* | Efficiency (gPoly/gM) * 10⁻⁶ |
|---|---|---|---|---|---|---|---|---|---|---|---|---|
| A1§ | 25 | 0.87 | 1.4 | 90 | 0.3 | 47 | 0.36 | 47 | 230 | 91 | 100 | 0.79 |
| B1 | 25 | 0.87 | 1.4 | 90 | 0.3 | 43 | 0.36 | 43 | 222 | 91 | 66.6 | 0.87 |
| C1 | 25 | 0.87 | 1.4 | 90 | 0.3 | 40 | 0.36 | 40 | 222 | 90 | 50 | 0.93 |
| D1 | 17.5 | 0.65 | 1.05 | 90 | 0.3 | 22 | 0.36 | 22 | 165 | 90 | 40 | 1.27 |
| E1§ | 14 | 1.06 | 0.65 | 90 | 0.3 | 14 | 0.36 | 24 | 120 | 90 | 100 | 2.00 |
| F1 | 14 | 1.06 | 0.65 | 91 | 0.3 | 16 | 0.36 | 25 | 120 | 90 | 66.6 | 1.75 |
| G1 | 14 | 1.06 | 0.65 | 92 | 0.3 | 16.5 | 0.36 | 20.1 | 120 | 91 | 50 | 1.70 |
| H1 | 14 | 1.06 | 0.65 | 91 | 0.3 | 20 | 0.36 | 20 | 120 | 90 | 40 | 1.40 |
| U1§ | 17.5 | 0.61 | 1.02 | 91 | 0.3 | 50 | 0.36 | 50 | 162 | 95 | 100 | 0.56 |
| V1 | 17.5 | 0.61 | 1.02 | 90 | 0.3 | 50 | 0.36 | 50 | 160 | 96 | 66.6 | 0.56 |
| W1 | 17.5 | 0.61 | 1.02 | 91 | 0.3 | 52 | 0.36 | 52 | 160 | 96 | 50 | 0.54 |
| X1 | 16.3 | 0.61 | 1.02 | 91 | 0.3 | 52 | 0.36 | 52 | 160 | 95 | 40 | 0.54 |
| Y1§ | 11 | 0.66 | 1.08 | 120 | 0.03 | 140 | 0.036 | 140 | 163 | 91 | 100 | 2.00 |
| Z1 | 11 | 0.66 | 1.02 | 120 | 0.03 | 140 | 0.036 | 140 | 163 | 91 | 66.6 | 2.00 |
| AA1 | 11 | 0.66 | 1.08 | 120 | 0.03 | 140 | 0.036 | 140 | 163 | 91 | 50 | 2.00 |
| AB1 | 11 | 0.66 | 1.08 | 120 | 0.03 | 140 | 0.03 | 140 | 163 | 91 | 40 | 2.00 |

TABLE 1B

Second reactor process conditions to produce diblock copolymers B1-D1, F1-H1, V1-X1, Z1-AB1.

| Example | Solvent feed (kg/hr) | Propylene feed (kg/hr) | Temp °C. | Catalyst conc (mmol/Kg) | Catalyst sol. Flow (g/hr) | Cocatalyst conc. (mmol/kg) | Cocatalyst sol. Flow (g/hr) | MMAO flow (gr/hr) | C3 conversion (%) | Efficiency** (gPoly/gM) * $10^{-6}$ |
|---|---|---|---|---|---|---|---|---|---|---|
| A1§ | | | | | | | | | | |
| B1 | 13 | 1.11 | 90 | 0.3 | 90 | 0.36 | 90 | 45 | 91 | 0.41 |
| C1 | 20 | 2.22 | 90 | 0.3 | 120 | 0.36 | 120 | 50 | 91 | 0.46 |
| D1 | 21 | 2.5 | 90 | 0.3 | 177 | 0.36 | 177 | 50 | 91 | 0.32 |
| E1§ | | | | | | | | | | |
| F1 | 10 | 0.83 | 91 | 0.3 | 24 | 0.36 | 24 | 100 | 91 | 1.11 |
| G1 | 16 | 1.66 | 90.2 | 0.3 | 92 | 0.36 | 92 | 80 | 91 | 0.52 |
| H1 | 21 | 2.5 | 90 | 0.3 | 175 | 0.36 | 175 | 80 | 91 | 0.37 |
| U1§ | | | | | | | | | | |
| V1 | 10 | 0.78 | 90.2 | 0.3 | 90 | 0.36 | 90 | 100 | 96 | 0.30 |
| W1 | 15 | 1.36 | 90.2 | 0.3 | 177 | 0.36 | 177 | 110 | 95 | 0.24 |
| X1 | 20.5 | 2.36 | 90.5 | 0.3 | 260 | 0.36 | 260 | 220 | 95 | 0.22 |
| Y1§ | | | | | | | | | | |
| Z1 | 10 | 0.83 | 120 | 0.03 | 160 | 0.036 | 160 | 100 | 90 | 1.40 |
| AA1 | 11 | 1.66 | 120.1 | 0.03 | 250 | 0.036 | 250 | 100 | 90 | 1.44 |
| AB1 | 16 | 2.5 | 120 | 0.3 | 60 | 0.3 | 60 | 100 | 90 | 0.95 |

Preparation of Fractionated Samples

Two to four grams of polymer is dissolved in 200 ml o-xylene under reflux conditions for 2 hours. The solution is then cooled in a temperature controlled water bath to 25° C. to allow the crystallization of the xylene insoluble fraction. Once the solution is cooled and the insoluble fraction precipitates from the solution, the separation of the xylene soluble fraction from the xylene insoluble fraction is done by filtration through a filter paper. The remaining o-xylene solvent is evaporated from the filtrate. Both xylene soluble (XS) and xylene insoluble (XI) fractions are dried in a vacuum oven at 100° C. for 60 min and then weighed.

For each set of samples, the xylene insoluble fraction is given the number "2" and the xylene soluble fraction the number "3". For example, sample B1 is subjected to the extraction procedure to produce sample B2 (the xylene insoluble fraction) and sample B3 (the xylene soluble fraction). Weights of the fractions are given below in Table 2.

Table 2 shows the analytical results for runs B1 through AB1. The molecular weight distributions of the polymers are relatively narrow with Mw/Mn's ranging from 2.1-2.3 for samples B1 through D1, and 2.2-2.8 for samples F1 through H1. For samples V1 through AB1, Mw/Mn's range from 2.1-2.5. For the corresponding xylene insoluble and soluble fractions for each of the runs (designated by the number 2 or 3), the Mw/Mn's range from 2.0 to 2.8.

Table 2 also shows the wt % of isolated PP identified by High Temperature Liquid Chromatography separation. The amount of isolated PP indicates to the amount of PP that is not incorporated into the block copolymer. The weight fraction of isolated PP and the weight fraction of xylene solubles substracted from 1 can be related to the yield of diblock polymer produced.

Table 3 shows the analytical results for runs B1, C1, D1 and F1, G1, H1.

The molecular weight distributions of the polymers are relatively narrow with Mw/Mn's ranging from 2.1-2.3 for samples B through D, and 2.2-2.8 for samples F through H.

TABLE 2

Analytical Summary Examples B1-AB1 and Fractions

| Example | Wt % from Extraction | Mw Kg/mol | Mw/Mn | Wt % $C_2$ | Tm (° C.) | Tc (° C.) | Melt Enthalpy (J/g) | Tg (° C.) | Wt % PP from HTLC Separation |
|---|---|---|---|---|---|---|---|---|---|
| B1 | NA | 123 | 2.2 | 45 | 130 | 85 | 43 | −46 | 11.8 |
| B2 | 37.8 | 165 | 2.0 | 20.3 | 131 | 93 | 80 | ND | 26 |
| B3 | 62.2 | 124 | 2.1 | 64.4 | 23 | 26, 11 | 27 | −49 | <0.1 |
| C1 | NA | 128 | 2.1 | 34 | 134 | 92 | 56 | −57 | — |
| C2 | 50.4 | 243 | 2.8 | 12.4 | 137 | 99 | 83 | ND | — |
| C3 | 49.6 | 136 | 2.1 | 61.1 | 9 | 5 | 26 | −51 | — |
| D1 | NA | 180 | 2.3 | 26 | 138 | 93 | 56 | −49 | 28.1 |
| D2 | 63.3 | 284 | 2.1 | 10.1 | 138 | 100 | 86 | ND | 44.1 |
| D3 | 37.7 | 130 | 2.1 | 61.5 | 11 | 6 | 28 | −51 | <0.1 |
| F1 | NA | 149 | 2.2 | 27 | 135 | 91 | 28 | −50 | 22 |
| F2 | 33.9 | 207 | 2.3 | 8.3 | 137 | 99 | 80 | ND | 49 |
| F3 | 66.1 | 143 | 2.1 | 38.5 | ND | ND | 1.4 | −51 | 0.8 |
| G1 | NA | 210 | 2.5 | 18.2 | 139 | 99 | 49 | −52 | — |
| G2 | 51.9 | 302 | 2.3 | 5.8 | 140 | 102 | 76 | −51 | — |
| G3 | 48.1 | 139 | 2.1 | 39.8 | ND | ND | ND | ND | — |
| H1 | NA | 251 | 2.8 | 14.8 | 141 | 103 | 61 | −53.5 | — |
| H2 | 60.6 | 371 | 2.5 | 4.4 | 142 | 105 | 83.5 | ND | — |
| H3 | 39.4 | 141 | 2.2 | 38.1 | ND | ND | 1.4 | −51 | — |
| V1 | NA | 120 | 2.1 | 45 | 131.1 | 88.3 | 59.3 | −44 | — |
| V2 | 41.7 | — | — | 20.4 | — | — | — | — | — |

TABLE 2-continued

Analytical Summary Examples B1-AB1 and Fractions

| Example | Wt % from Extraction | Mw Kg/mol | Mw/Mn | Wt % C$_2$ | Tm (° C.) | Tc (° C.) | Melt Enthalpy (J/g) | Tg (° C.) | Wt % PP from HTLC Separation |
|---|---|---|---|---|---|---|---|---|---|
| V3 | 58.3 | — | — | 67 | — | — | — | — | — |
| W1 | NA | 148 | 2.1 | 34 | 135.2 | 96.7 | 68.2 | −44.2 | — |
| W2 | 57 | — | — | 15.9 | — | — | — | — | — |
| W3 | 43.0 | — | — | 67.8 | — | — | — | — | — |
| X1 | NA | 198 | 2.5 | 26 | 138.4 | 101.4 | 73.7 | −48.2 | — |
| X2 | 65.5 | — | — | 11.3 | — | — | — | — | — |
| X3 | 34.5 | — | — | 64.1 | — | — | — | — | — |
| Z1 | NA | 114 | 2.2 | 27 | 120.4 | 71.4 | 54.4 | −43.9 | — |
| Z2 | 31.7 | — | — | 18.9 | — | — | — | — | — |
| Z3 | 68.3 | — | — | 65.9 | — | — | — | — | — |
| AA1 | NA | 136 | 2.2 | 20 | 129.6 | 88.8 | 64.1 | −45.3 | — |
| AA2 | 50.7 | — | — | 14.9 | — | — | — | — | — |
| AA3 | 49.3 | — | — | 69 | — | — | — | — | — |
| AB1 | NA | 168 | 2.4 | 15 | 134.7 | 97.6 | 67.9 | −47.5 | — |
| AB2 | 64.4 | — | — | 11.8 | — | — | — | — | — |
| AB3 | 35.6 | — | — | 67.7 | — | — | — | — | — |

FIG. 1 shows the DSC melting curve for the B1 sample. The peak at 130° C. corresponds to the iPP "hard" polymer and the broader peak at 30° C. corresponds to the EP "soft" polymer; the glass transition temperature at −46° C. also corresponds to the EP "soft" polymer containing 64 wt % ethylene (C$_2$).

Figure 2:
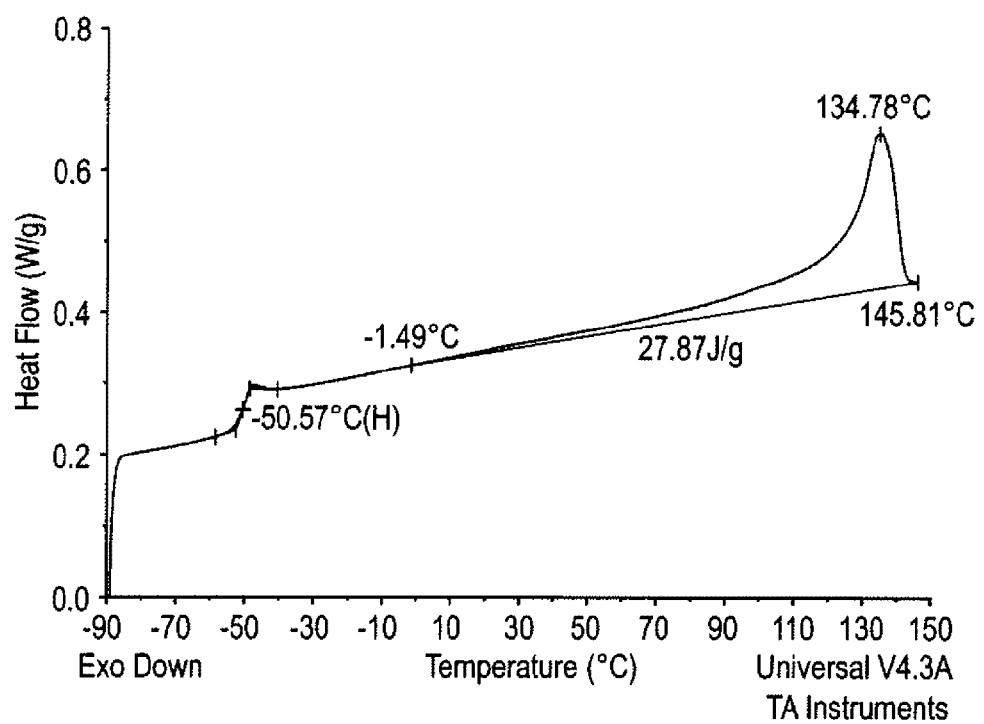
FIG. 2 shows the DSC melting curve for Example F1.

FIG. 2 shows the DSC melting curve for the F1 sample. The peak at 135° C. corresponds to the iPP "hard" polymer and the absence of crystallinity below room temperature corresponds to the EP "soft" polymer containing 40 wt % C$_2$. The −50° C. Tg confirms the presence of the EP "soft" polymer containing 40 wt % C$_2$.

Figure 3:
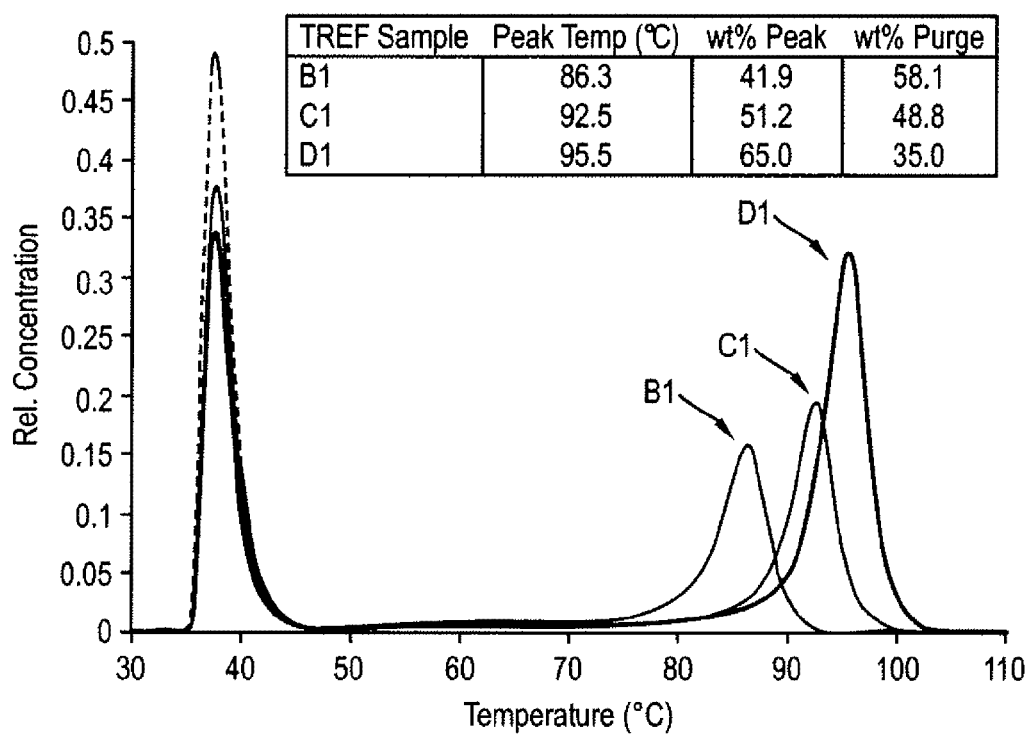
FIG. 3 compares the TREF profiles of Examples B1, C1 and D1.

The presence of block copolymer can alter the crystallization characteristics of a polymer chain if measured by TREF or solution fractionation. FIG. 3 compares the TREF profiles of samples B1 through D1. The TREF profiles are consistent with the DSC results, showing a highly crystalline fraction (elution above 40° C.) and a low crystallinity, soluble fraction (remaining material that elutes at less than 40° C.). The elution temperature increases with the amount of iPP present. An EP block connected to an iPP block may enhance the chains' solubility in the solvent and/or interfere with the crystallization of the iPP block.

Figure 4:
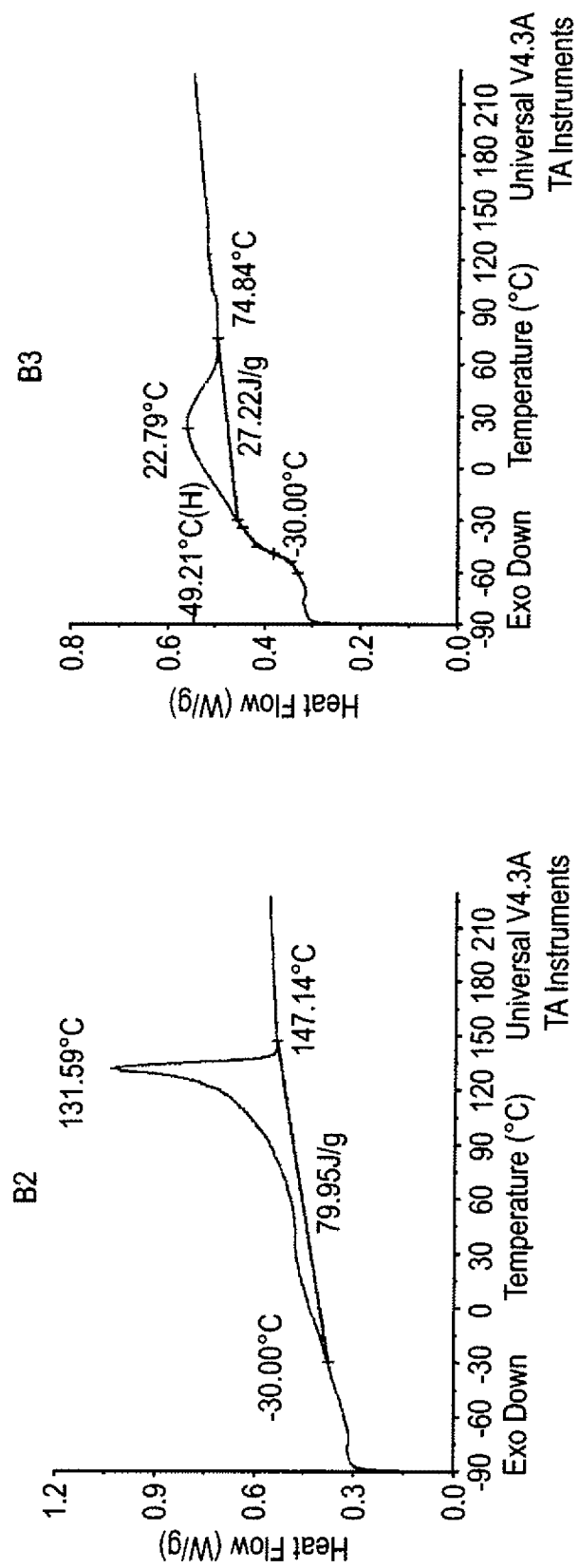
FIG. 4 shows DSC curves of Examples B2 and B3.
Figure 5:
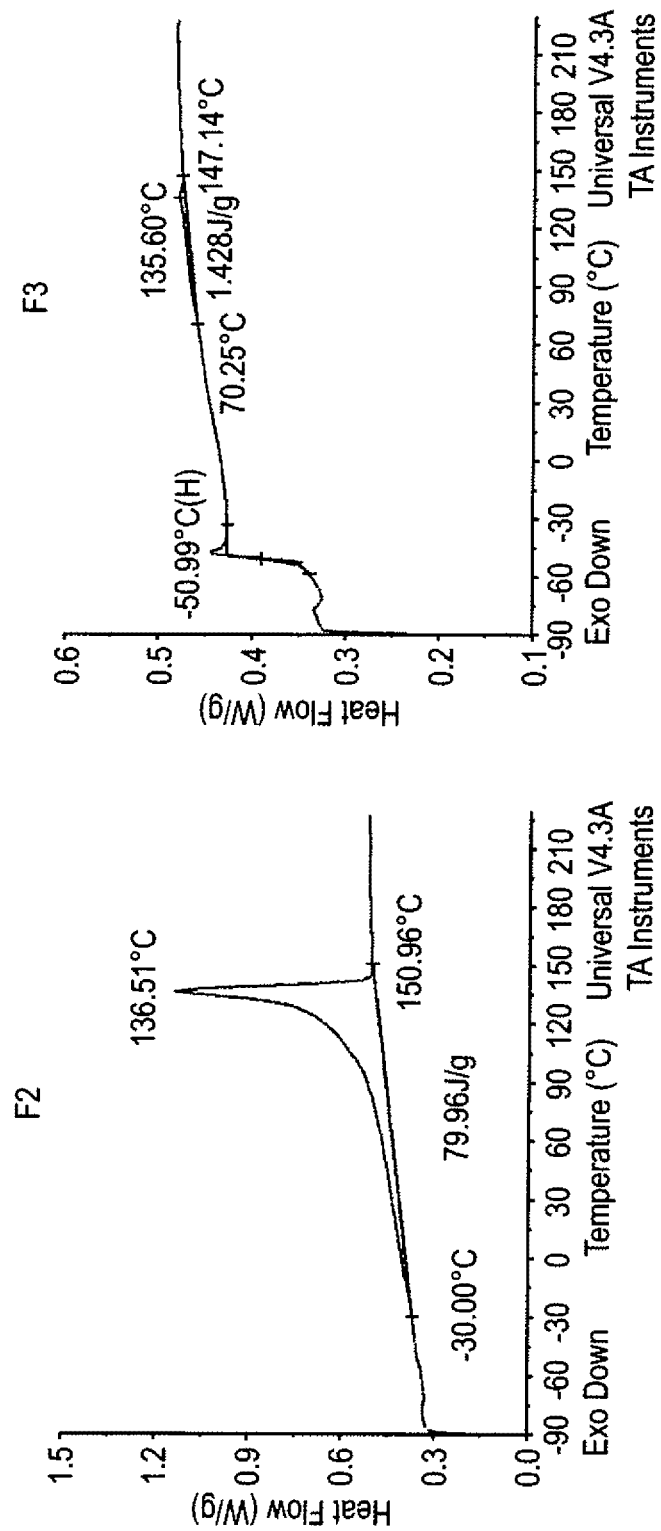
FIG. 5 shows DSC curves of Examples F2 and F3.

FIGS. 4 and 5 show the corresponding DSC curves of the fractions of B2, B3 and F2, F3.

In this analysis, the xylene soluble fraction is an estimate of the amount of non-crystallizable soft polymer. For the xylene soluble fractions from samples B1-D1, the weight percent of ethylene is between 61 and 65 wt % ethylene with no detection of residual isotactic propylene. The DSC of the xylene soluble fraction confirms that no high crystallinity polypropylene is present.

Conversely, the insoluble fraction (designated as number 2) can contain an amount of iPP polymer and iPP-EP diblock. Since the crystallization and elution of the polymer chain is governed by its longest crystallizable propylene sequence, the diblock copolymer will precipitate along with the iPP polymer. This is verified by the NMR and DSC analysis that shows an appreciable, and otherwise unexplainable, amount of ethylene present in the "insoluble" fraction. In a typical separation of an iPP and EP rubber blend, the isotactic PP will be cleanly separated by this analysis. The fact that there is "additional" ethylene present in the insoluble fraction, verifies that a fraction of diblock is present. By accounting for the total mass balance of monomer between the fractions, a block composite index can be estimated.

Another indication of the presence of diblock is the increase in molecular weight of the insoluble fractions with the increasing amount of iPP. As the polymer chains are being coordinatively coupled while passing from the first reactor to the second reactor, it is expected that the molecular weight of the polymer will increase. Table 3 shows that the molecular weight of the soluble fractions remains relatively constant (120-140 kg/mol). This is expected because the reactor conditions to make the EP soft block were unchanged from run to run. However, the molecular weight of the insoluble fractions increases with the increase in production rate of reactor 2, to create longer iPP blocks.

Estimating the Block Composite Index

The inventive examples show that the insoluble fractions contain an appreciable amount of ethylene that would not otherwise be present if the polymer was simply a blend of iPP homopolymer and EP copolymer. To account for this "extra ethylene", a mass balance calculation can be performed to estimate a block composite index from the amount of xylene insoluble and soluble fractions and the weight % ethylene present in each of the fractions.

A summation of the weight % ethylene from each fraction according to equation 1 results in an overall weight % ethylene (in the polymer). This mass balance equation can also be used to quantify the amount of each component in a binary blend or extended to a ternary, or n-component blend.

$$\text{Wt \% } C_{2\,Overall} = w_{Insoluble}(\text{wt \% } C_{2\,Insoluble}) + w_{soluble}(\text{wt \% } C_{2\,soluble}) \quad \text{Eq. 1}$$

Applying equations 2 through 4, the amount of the soft block (providing the source of the extra ethylene) present in the insoluble fraction is calculated. By substituting the weight % C$_2$ of the insoluble fraction in the left hand side of equation 2, the weight % iPP hard and weight % EP soft can be calculated using equations 3 and 4. Note that the weight % of ethylene in the EP soft is set to be equal to the weight % ethylene in the xylene soluble fraction. The weight % ethylene in the iPP block is set to zero or if otherwise known from its DSC melting point or other composition measurement, the value can be put into its place.

$$Wt\ \%\ C_{2_{Overall\ or\ xylene\ insoluble}} = \qquad\qquad\qquad\qquad\qquad \text{Eq. 2}$$
$$w_{iPPHard}(wt\ \%\ C_{2_{iPP}}) + w_{EPsoft}(wt\ \%\ C_{2_{EPsoft}})$$

$$w_{iPPhard} = \frac{wt\ \%\ C_{2_{overall\ or\ xylene insoluble}} - wt\ \%\ C_{2_{EPsoft}}}{wt\ \%\ C_{2_{iPPhard}} - wt\ \%\ C_{2_{EPsoft}}} \qquad \text{Eq. 3}$$

$$w_{EPsoft} = 1 - w_{iPPHard} \qquad\qquad\qquad\qquad \text{Eq. 4}$$

After accounting for the 'additional' ethylene present in the insoluble fraction, the only way to have an EP copolymer present in the insoluble fraction, the EP polymer chain must be connected to an iPP polymer block (or else it would have been extracted into the xylene soluble fraction). Thus, when the iPP block crystallizes, it prevents the EP block from solubilizing.

To estimate the block composite index, the relative amount of each block must be taken into account. To approximate this, the ratio between the EP soft and iPP hard is used. The ratio of the EP soft polymer and iPP hard polymer can be calculated using Equation 2 from the mass balance of the total ethylene measured in the polymer. Alternatively it could also be estimated from a mass balance of the monomer and comonomer consumption during the polymerization. Refer to Table 3 for the estimated ratio of iPP and EP present in the diblock copolymer for all the runs. The weight fraction of iPP hard and weight fraction of EP soft is calculated using Equation 2 and assumes the iPP hard contains no ethylene. The weight % ethylene of the EP soft is the amount of ethylene present in the xylene soluble fraction.

TABLE 3

Block Composite Index Estimations for Examples B1 through AB3

| Sample | wt fraction EP Soft | wt fraction iPP Hard | Block Composite Index |
|---|---|---|---|
| B1 | 0.30 | 0.70 | 0.16 |
| B2 | 0.32 | 0.68 | 0.42 |
| B3 | 0 | 100 | 0 |
| C1 | 0.56 | 0.44 | 0.17 |
| C2 | 0.20 | 0.80 | 0.34 |
| C3 | 0 | 100 | 0 |
| D1 | 0.42 | 0.58 | 0.22 |
| D2 | 0.16 | 0.84 | 0.35 |
| D3 | 0 | 100 | 0 |
| F1 | 0.70 | 0.30 | 0.10 |
| F2 | 0.22 | 0.78 | 0.29 |
| F3 | 0 | 100 | 0 |
| G1 | 0.46 | 0.54 | 0.15 |
| G2 | 0.15 | 0.85 | 0.29 |
| G3 | 0 | 100 | 0 |
| H1 | 0.39 | 0.61 | 0.18 |
| H2 | 0.12 | 0.88 | 0.29 |
| H3 | 0 | 100 | 0 |
| V1 | 0.67 | 0.33 | 0.18 |
| V2 | 0.30 | 0.70 | 0.43 |
| V3 | 0 | 100 | 0 |
| W1 | 0.50 | 0.50 | 0.24 |
| W2 | 0.23 | 0.77 | 0.42 |
| W3 | 0 | 100 | 0 |
| X1 | 0.41 | 0.59 | 0.25 |
| X2 | 0.18 | 0.82 | 0.39 |
| X3 | 0 | 100 | 0 |
| Z1 | 0.41 | 0.59 | 0.12 |
| Z2 | 0.29 | 0.71 | 0.38 |
| Z3 | 0 | 100 | 0 |
| AA1 | 0.29 | 0.71 | 0.18 |
| AA2 | 0.22 | 0.78 | 0.35 |
| AA3 | 0 | 100 | 0 |
| AB1 | 0.22 | 0.78 | 0.24 |
| AB2 | 0.17 | 0.83 | 0.38 |
| AB3 | 0 | 100 | 0 |

For example, if an inventive iPP-EP polymer contains an overall of 47 wt % $C_2$ and is made under the conditions to produce an EP soft polymer with 67 wt % $C_2$ and an iPP homopolymer containing zero ethylene, the amount of EP soft and iPP hard is 70 wt % and 30 wt %, respectively (as calculated using Equations 3 and 4). If the percent of EP is 70 wt % and the iPP is 30 wt %, the relative ratio of the EP:iPP blocks could be expressed as 2.33:1.

Hence, if one skilled in the art, carries out a xylene extraction of the polymer and recovers 40 wt % insoluble and 60 wt % soluble, this would be an unexpected result and this would lead to the conclusion that a fraction of inventive block copolymer was present. If the ethylene content of the insoluble fraction is subsequently measured to be 25 wt % $C_2$, Equations 2 thru 4 can be solved to account for this additional ethylene and result in 37.3 wt % EP soft polymer and 62.7 wt % iPP hard polymer present in the insoluble fraction.

Since the insoluble fraction contains 37.3 wt % EP copolymer, it should be attached to an additional 16 wt % of iPP polymer based on the EP:iPP block ratio of 2.33:1. This brings the estimated amount of diblock in the insoluble fraction to be 53.3 wt %. For the entire polymer (unfractionated), the composition is described as 21.3 wt % iPP-EP Diblock, 18.7 wt % iPP polymer, and 60 wt % EP polymer. As the compositions of these polymers are novel, the term block composite index (BCI) is herein defined to equal the weight percentage of diblock divided by 100% (i.e. weight fraction). The value of the block composite index can range from 0 to 1, wherein 1 would be equal to 100% inventive diblock and zero would be for a material such as a traditional blend or random copolymer. For the example described above, the block composite index for the block composite is 0.213. For the insoluble fraction, the BCI is 0.533, and for the soluble fraction the BCI is assigned a value of zero.

Depending on the estimations made of the total polymer composition and the error in the analytical measurements which are used to estimate the composition of the hard and soft blocks, between 5 to 10% relative error is possible in the computed value of the block composite index. Such estimations include the wt % C2 in the iPP hard block as measured from the DSC melting point, NMR analysis, or process conditions; the average wt % C2 in the soft block as estimated from the composition of the xylene solubles, or by NMR, or by DSC melting point of the soft block (if detected). But overall, the block composite index calculation reasonably accounts for the unexpected amount of 'additional' ethylene present in the insoluble fraction, the only way to have an EP copolymer present in the insoluble fraction, the EP polymer chain must be connected to an iPP polymer block (or else it would have been extracted into the xylene soluble fraction).

More specifically, example H1, contains an overall of 14.8 wt % $C_2$ and the weight % C2 in the xylene solubles (H3) was measured to be 38.1 wt % (as a representation of the composition of the EP soft polymer) and an iPP homopolymer containing zero ethylene, the amount of EP soft and iPP hard is 61 wt % and 39 wt %, respectively (as calculated using Equations 3 and 4). If the percent of EP is 61 wt % and the iPP is 39 wt %, the relative ratio of the EP:iPP blocks could be expressed as 1.56:1.

After xylene extraction of the H1 polymer, 60.6 wt % insoluble (H2) and 39.4 wt % soluble (B3) polymer was recovered. The B2 insoluble fraction is subsequently measured to have 4.4 wt % $C_2$, Equations 2 thru 4 can be solved to account for this additional ethylene and result in 11.5 wt % EP soft polymer and 88.5 wt % iPP hard polymer.

Since the insoluble fraction contains 11.5 wt % EP copolymer, it should be attached to an additional 7.35 wt % of iPP polymer based on the EP:iPP block ratio of 1.56:1. This brings the estimated amount of diblock in the insoluble fraction to be 29.6 wt %. For the entire polymer (unfractionated), the composition is described as 18 wt % iPP-EP Diblock, 42.6 wt % iPP polymer, and 39.4 wt % EP polymer. For this H1 example described above, the block composite index for the block composite is 0.18. For the insoluble fraction (H2), the BCI is 0.29, and for the H3 soluble fraction the BCI is assigned a value of zero.

Figure 6:
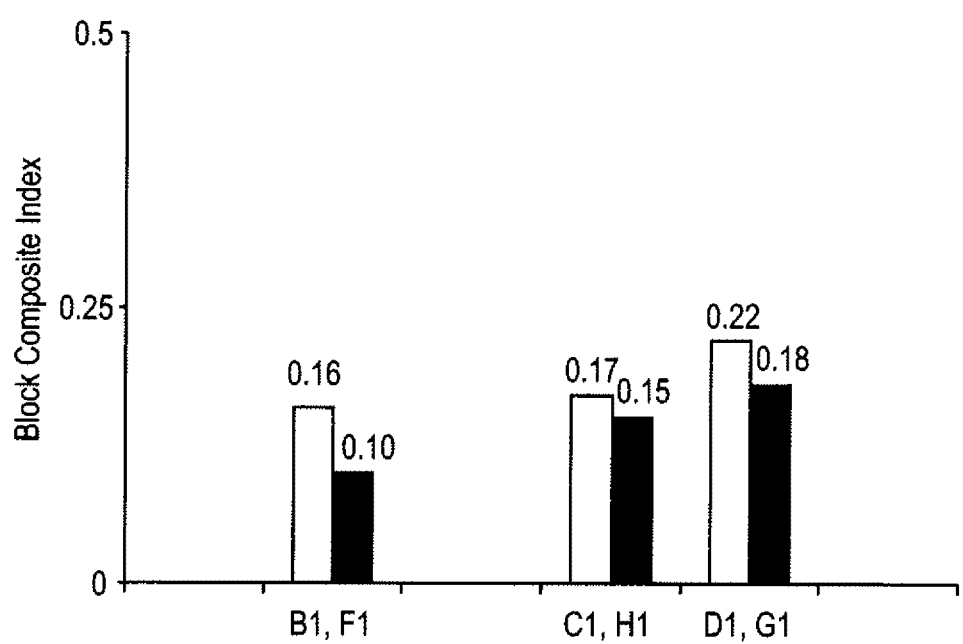
FIG. 6 shows Block Composite Index for Examples B1, F1, C1, H1, D1 and G1.

Table 3 and FIG. 6 show the block composite indices for runs B1 through AB1. For runs B1, C1, and D1, the BCI values are 0.16, 0.17, and 0.22, respectively. For the associated xylene insoluble fractions, fractions B2, C2, D2, the BCI values are 0.42, 0.34, and, 0.35, respectively. For runs F1, G1, and H1, the BCI values are 0.10, 0.15, and 0.18, respectively. For the associated xylene insoluble fractions, fractions F2, G2, H2, the BCI values are 0.29, 0.29, and, 0.29, respectively.

Figure 7:
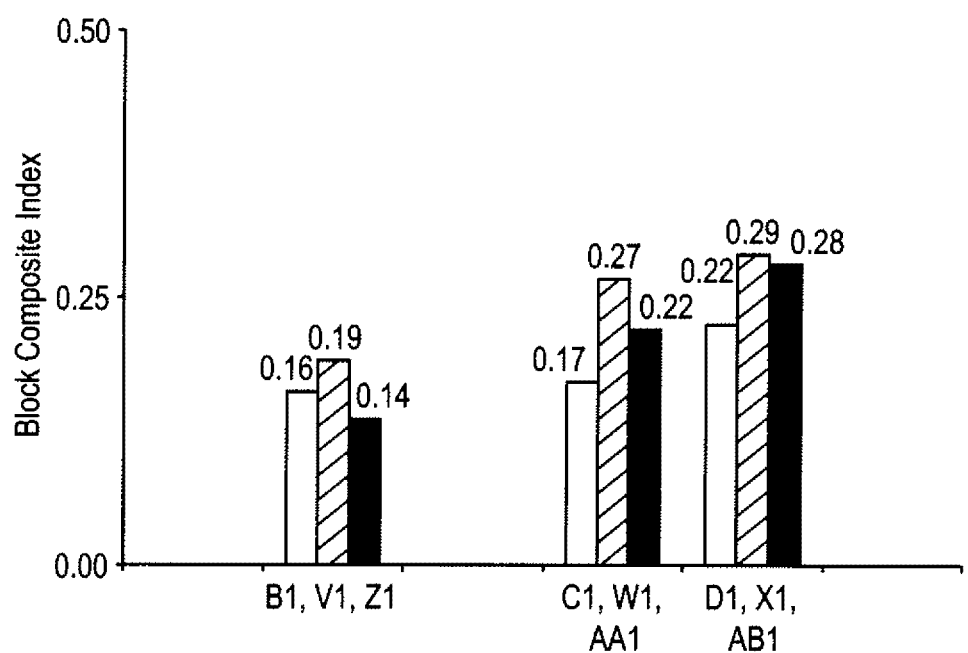
FIG. 7 shows Block Composite Index for Examples B1, V1, Z1, C1, W1, AA1, D1, X1, and AB1.

Table 3 and FIG. 7 show for runs V1, W1, X1, increasing the propylene reactor conversion from 90 to 95% increases the BCI by 0.03 to 0.09 to result in BCI values of 0.18, 0.24, and 0.25.

Table 3 and FIG. 7 show for runs Z1, AA1, AB1 increasing the reactor temperature from 90 to 120° C. resulted in BCI values of 0.12, 0.18, and 0.24, respectively.

Dynamic Mechanical Analysis

Figure 8:
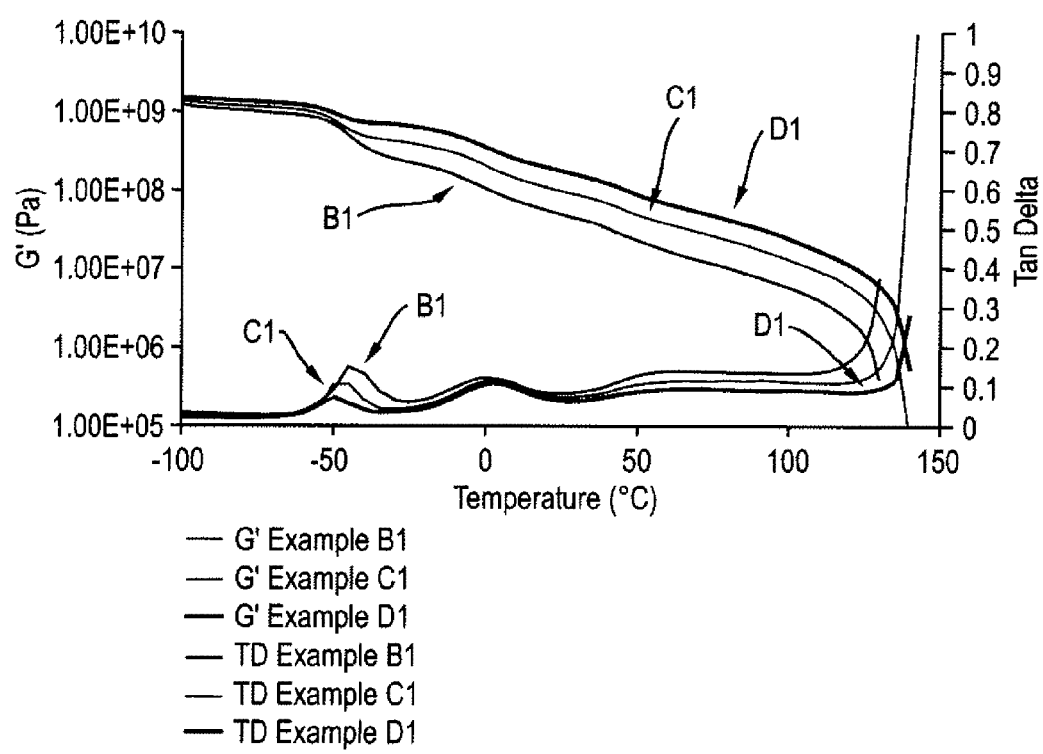
FIG. 8 shows Dynamic Mechanical Analysis of Examples B1, C1 and D1.

FIG. 8 shows the dynamic mechanical properties of samples B1 through D1; shown is the G' and Tan delta values versus temperature. By increasing the amount of iPP, the G' modulus increases and the high temperature plateau is extended. Sample D1 shows that the modulus decreases with increasing temperature up to about 140° C. before completely softening after its melting transition.

For each sample, the tan delta curve shows a characteristic Tg between −48 to −50° C. for the ethylene-propylene copolymer and a second Tg at about 0° C. from the isotactic polypropylene. Above 50° C., the tan delta response remains constant until melting begins and the modulus decreases rapidly.

Figure 9:
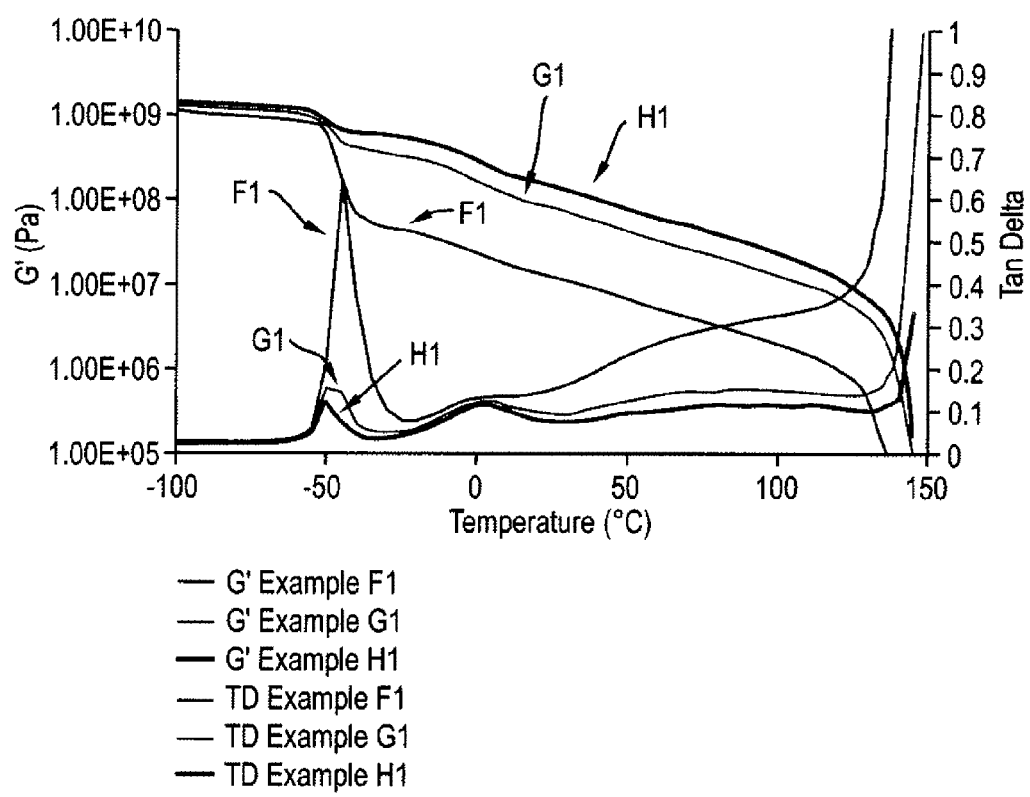
FIG. 9 shows Dynamic Mechanical Analysis of Examples F1, G1 and H1.

FIG. 9 shows the dynamic mechanical properties of samples F1 through H1; shown are the G' and Tan delta values versus temperature. Similar to the 65 wt % $C_2$ case, by increasing the amount of iPP, the G' modulus increases and the high temperature plateau is extended. Sample H1 shows that the modulus decreases with increasing temperature up to about 140° C. before completely softening after its melting transition.

The tan delta curves for these samples, also show a characteristic Tg between −48 to −50° C. for the ethylene-propylene copolymer and a second Tg about 0° C. relating to the isotactic polypropylene. Above 50° C., the tan delta response remains constant for samples G1 & H1 until melting begins and the modulus decreases rapidly.

Morphology Discussion

Figure 10:
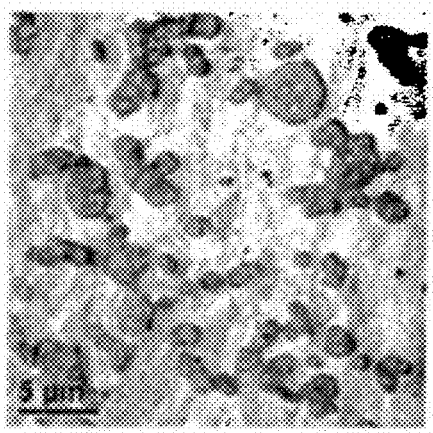
FIG. 10 shows a TEM Micrograph of Profax Ultra SG853 Polypropylene Impact Copolymer at 5 μm and 1 μm scales.
Figure 10:
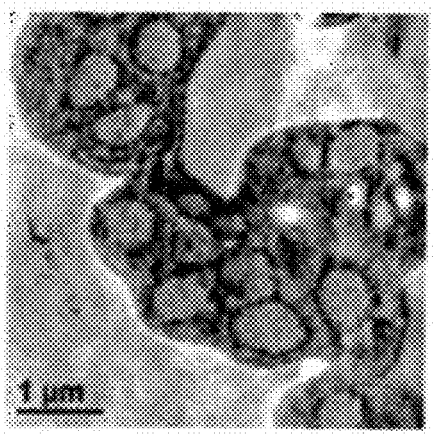

The samples are analyzed by TEM to observe the influence of the diblock on the overall iPP/EPR rubber morphology. FIG. 10 shows the TEM image of ProFax Ultra SG853 impact copolymer (LyondellBasell Polyolefins) consisting of an isotactic PP continuous phase and 17 wt % rubber phase, containing 58 wt % $C_2$ in the rubber.

The TEM micrograph shown at the 5 μm scale, shows large EPR domains ranging from 2-5 μm.

At 1 μm magnification, the EPR domain has a heterogeneous composition distribution of ethylene and propylene as shown from the dark and light colored domains present within the particle. This is a classical example of a dispersed morphology containing two phases (iPP and EP rubber) that are immiscible with each other.

Figure 11:
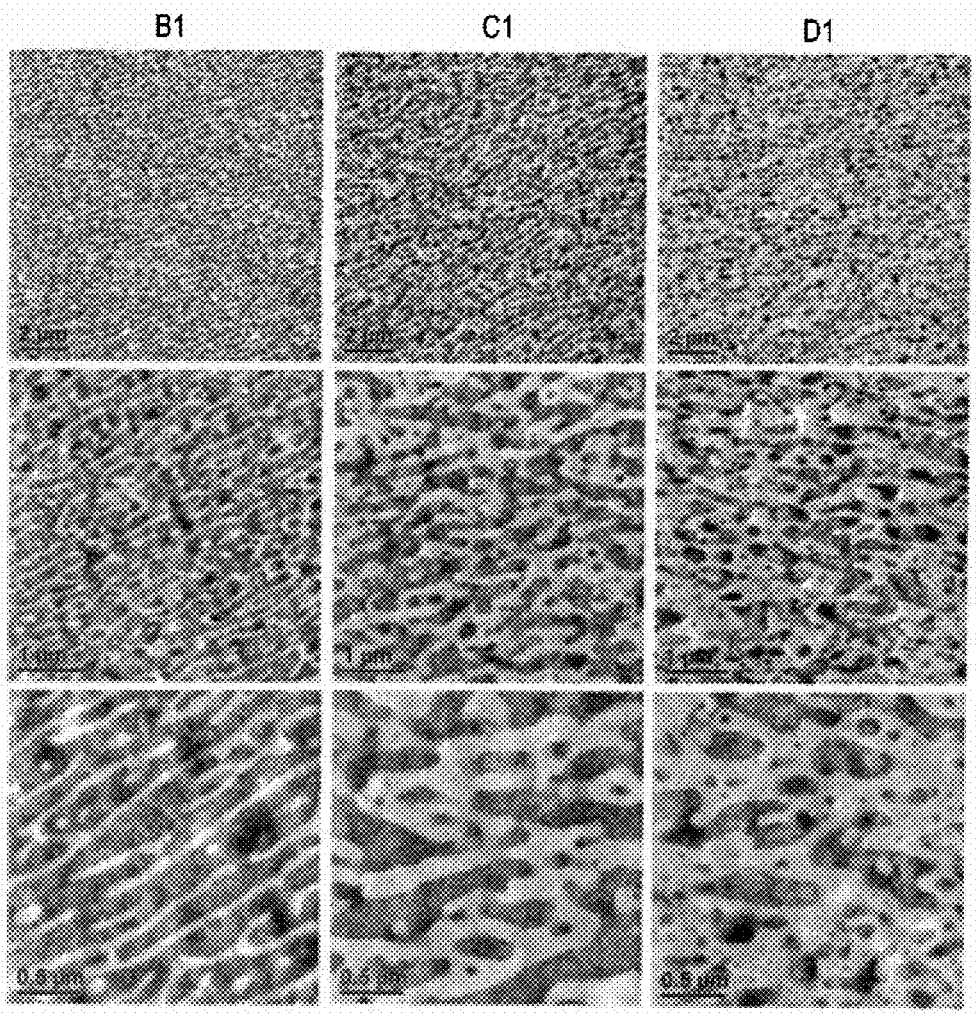
FIG. 11 shows TEM Micrographs of Examples B1, C1 and D1 at 2 μm, 1 μm and 0.5 μm scales.

FIG. 11 shows the TEM micrographs of compression molded films of B1, C1, and D1 at the 2, 1, and 0.5 μm scale. In stark contrast to the image from the impact copolymer, all three polymers show a finer dispersion of particles with very small domains. For B1, a continuous EPR phase is observed along with elongated PP domains on the order of 80-100 nm in width. For C1, a mixed continuity between the iPP and EPR phases was observed with domain sizes on the 200-250 nm. For D1, a PP continuous phase is observed along with spherical and some elongated EPR domains on the size 150-300 nm.

Figure 12:
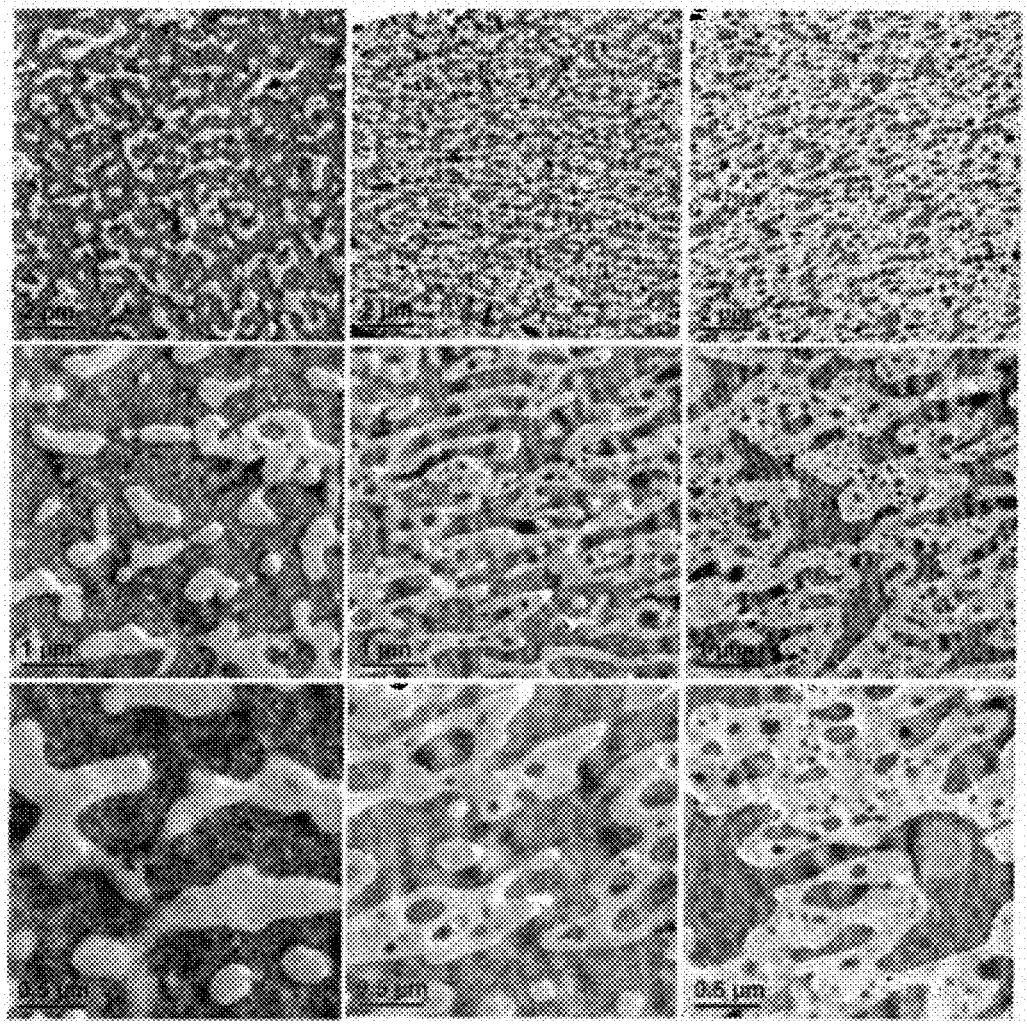
FIG. 12 shows TEM Micrographs of Examples F1, G1 and H1 at 2 μm, 1 μm and 0.5 μm scales.

FIG. 12 shows the TEM micrographs of compression molded films of F1, G1, and H1 at the 2, 1, and 0.5 μm scale. In stark contrast to the image from the impact copolymer, all three polymers show a finer dispersion of particles with very small domains. For F1, a continuous EPR phase is observed along with elongated PP domains on the order of 200-400 nm in width. For C1, a mixed continuity between the iPP and EPR phases was observed with domain sizes on the 200-300 nm. For H1, a PP continuous phase is observed along with spherical and some elongated EPR domains on the size 150-300 nm.

It is surprising to observe such well-dispersed and small domains as shown in these micrographs from polymers that were compression molded from pellets. Normally to get a fine morphology (not near the scales shown here), specialized extrusion and compounding histories are required. Even if the size scales are approached using blending, the morphologies may not be stable; phase coarsening and agglomeration can occur with the thermal aging, as shown by the impact copolymer in which the rubber domains are elongated and some of them chain-linked together.

The morphology of the diblock copolymer was further investigated by examining the polymer fractions obtained from xylene fractionation. As explained above, the insoluble fraction contains iPP-EP diblock and free iPP homopolymer while the soluble fraction contains, the non-crystallizable EP rubber.

Figure 13:
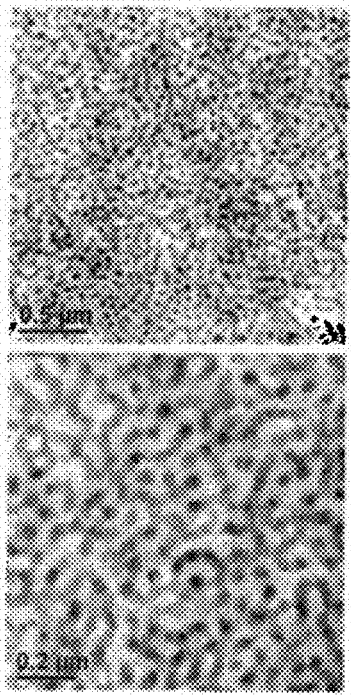
FIG. 13 shows TEM micrographs of Examples B2, D2 and B3 at 0.5 μm and 0.2 μm scales.
Figure 13:
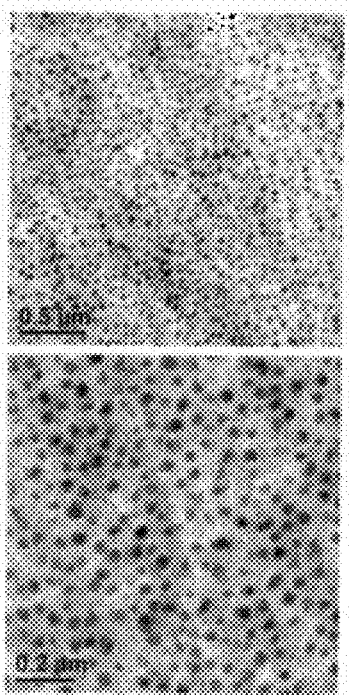
Figure 13:
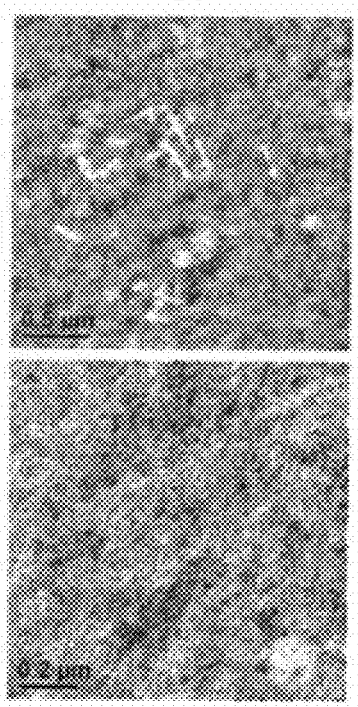

FIG. 13 shows the TEM micrographs of the insoluble fractions from B1 and D1 and also the soluble fraction from B1. Remarkably, the morphology observed in the insoluble fraction is even finer and more distinct than that of the whole polymer. The B1 insoluble fraction shows a mixture of worm-like and spherical EPR domains, on the size-scale of 50 nm in width. The D1 insoluble fraction shows small spherical domains that are also about 50 nm in diameter. For reference, the B1 xylene soluble fraction shows the typical granular lamellar structure that is expected of an EP elastomer containing 65 wt % $C_2$. Again, the morphologies of the insoluble fractions are distinct and appear to be microphase separated.

Figure 14:
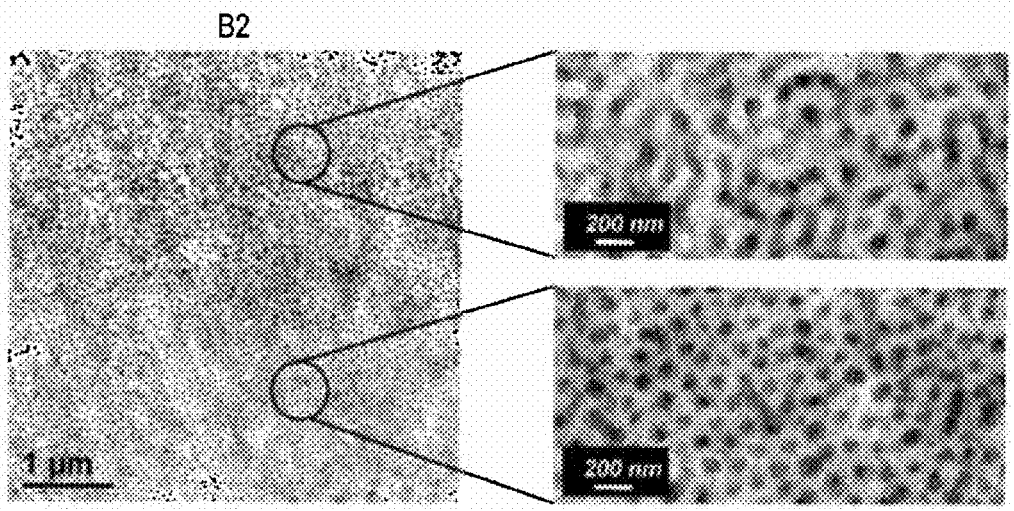
FIG. 14 shows Example B2 at 1 μm and 200 nm scales.
Figure 15:
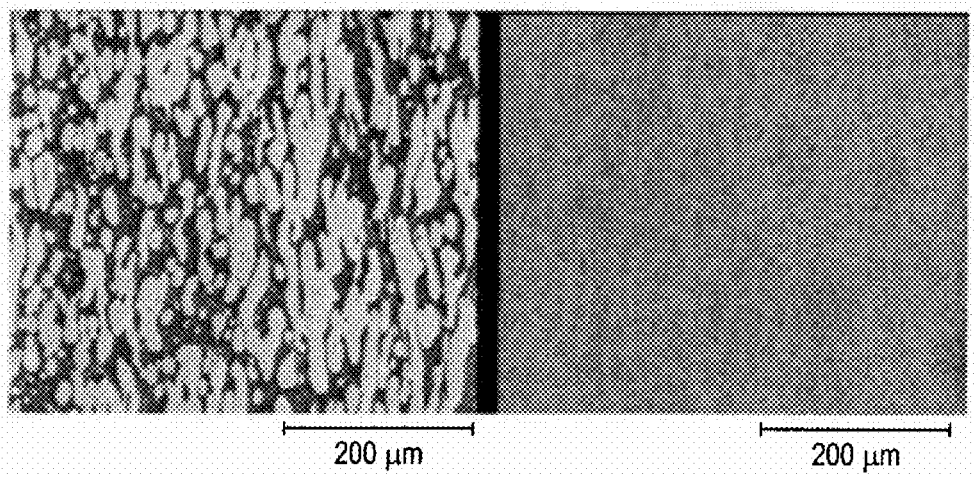
FIG. 15 shows SEM images of Comparative Example 1 on the left and Example 1 on the right at the 200 μm scale.
Figure 16:
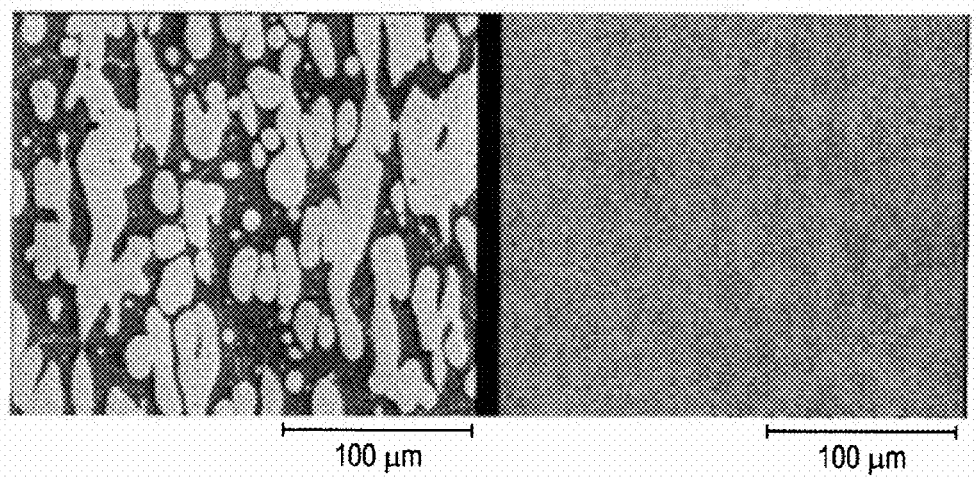
FIG. 16 shows SEM images of Comparative Example 1 on the left and Example 1 on the right at the 100 μm scale.
Figure 17:
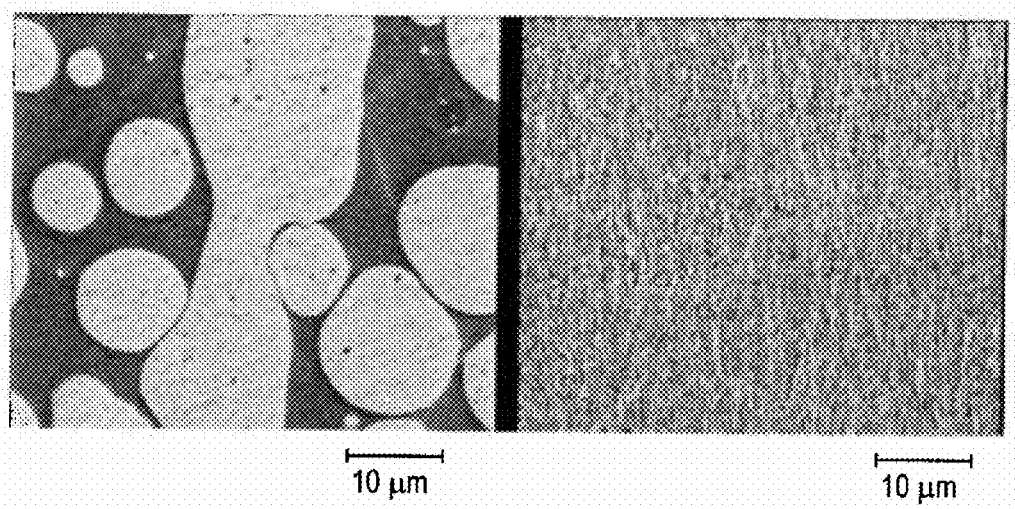
FIG. 17 shows SEM images of Comparative Example 1 on the left and Example 1 on the right at the 10 μm scale.
Figure 18:
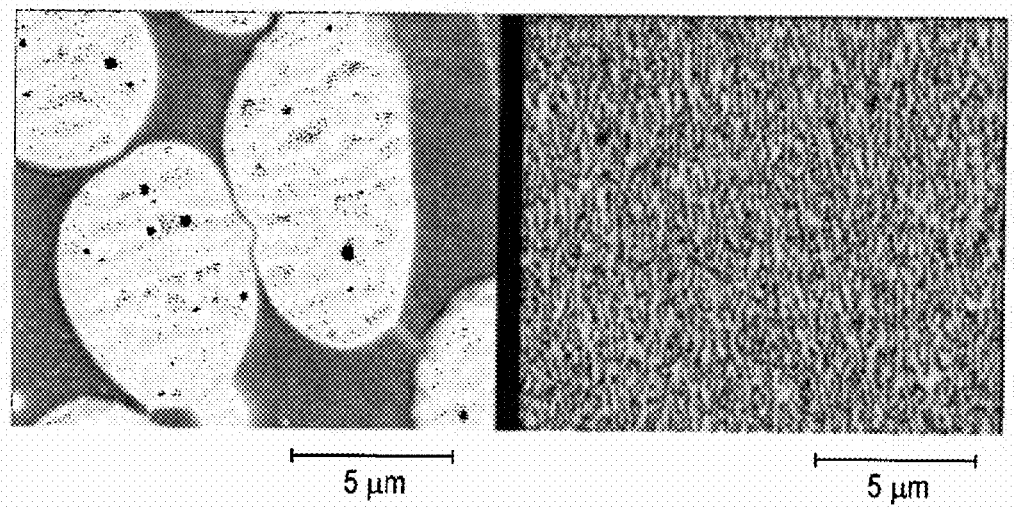
FIG. 18 shows SEM images of Comparative Example 1 on the left and Example 1 on the right at the 5 μm scale.

It is interesting to compare the TEM micrographs of the B1 insoluble fraction, FIG. 15, to that of an sPP-EP-sPP triblock containing 71 wt % sPP, such as that shown in FIG. 7 of Macromolecules, Vol. 38, No. 3, page 857, 2005. In this figure, the sPP-EP-sPP triblock was produced via anionic polymerization and the micrograph is from a film annealed at 160° C. for over one week. The sample was annealed in the melt for a total of 8 days—the first 4 days at 200° C. to erase any previous thermal history and then an additional 4 days at a final temperature 160° C. High-vacuum ovens (<10$^{-7}$ mbar) were used to prevent degradation by oxidation. Melt morphology was preserved by quickly quenching the samples after annealing. The authors of the article associate the phase separated microstructure to hexagonally packed cylinders. Although the B1 insoluble fraction is prepared from a compression molded film that is fast quenched, the morphology resembles that of an ordered structure perhaps with some hexagonally packed cylinders (FIG. 14).

Soft Compound Studies

Example 1 is made by blending 80 wt % Example C1 with 20 wt % Hydrobrite™ 550 paraffinic oil (Sonneborn Inc.) in a Haake Bowl at 190° C. Comparative Example 1 is made by blending 30 wt % NORDEL™ 3722 EPDM copolymer (Mw 120000 g/mol, Mw/Mn 4.7) (The Dow Chemical Company), 40 wt % hPP 5E16S (35 MFR, Mw 181,000 g/mol, Mw/Mn 3.4) (The Dow Chemical Company), and 20 wt % Hydrobrite™ 550 oil in a Haake Bowl.

Example 2 is made by blending 60 wt % Example C1 with 40 wt % Hydrobrite™ 550 paraffinic oil (Sonneborn Inc.) in a Haake Bowl at 190° C. Comparative Example D is made by blending 53.6 wt % NORDEL™ 3722 EPDM copolymer (Mw 120000 g/mol, Mw/Mn 4.7) (The Dow Chemical Company), 26.4 wt % hPP 5E16S (35 MFR, Mw 181,000 g/mol, Mw/Mn 3.4) (The Dow Chemical Company), and 20 wt % Hydrobrite™ 550 oil in a Haake Bowl. Comparative Example E is made by blending 30 wt % NORDEL™ 3722 EPDM copolymer (Mw 120000 g/mol, Mw/Mn 4.7) (The Dow Chemical Company), 30 wt % hPP 5E16S (35 MFR, Mw 181,000 g/mol, Mw/Mn 3.4) (The Dow Chemical Company), and 40 wt % Hydrobrite™ 550 oil in a Haake Bowl.

FIGS. 15-18 show SEM images of Comparative Example 1 and Example 1 on a 200 μm scale, 100 μm scale, 10 μm scale and a 5 μm scale respectively.

In FIG. 15, it may be seen that Comparative Example 1 shows a continuous iPP matrix having very coarse dispersed EPDM elastomer domains ranging from 1 to >300 um in length. Conversely, at the same magnification, the phases were too small to be observed for Example 1.

At higher magnifications, it appears that Example 1 is comprised of a more continuous iPP matrix phase with more dispersed, lower density EP fractions. In some areas, the EP fractions appeared encapsulated by iPP and, in other locations, they appeared more interconnected.

Figure 19:
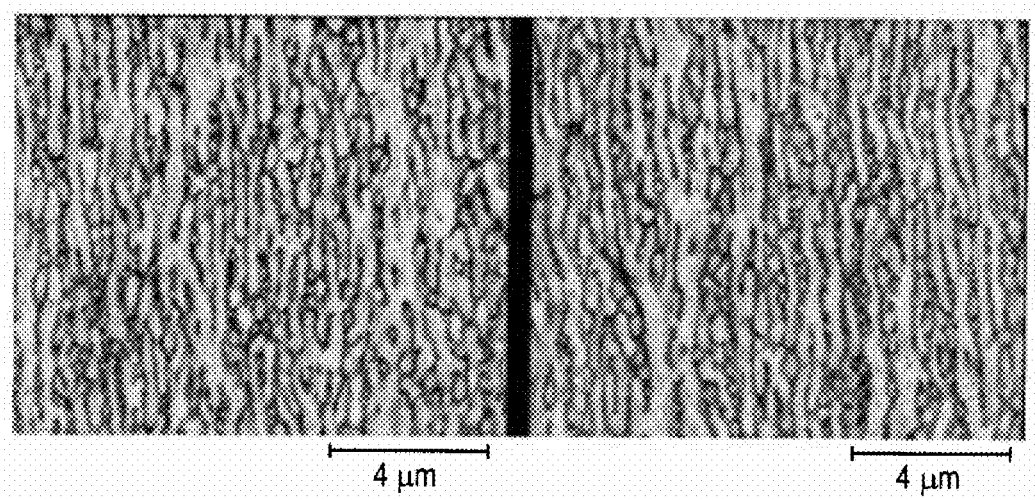
FIG. 19 shows SEM images of Example 1 at the 4 μm scale.

Higher magnification images shown in FIG. 19 at the 4 μm scale more clearly show some of the spherical, lower density EP fractions which appeared encapsulated by a more continuous iPP matrix. The smaller EP domains ranged from approximately 100 nm-300 nm in diameter.

Figure 20:
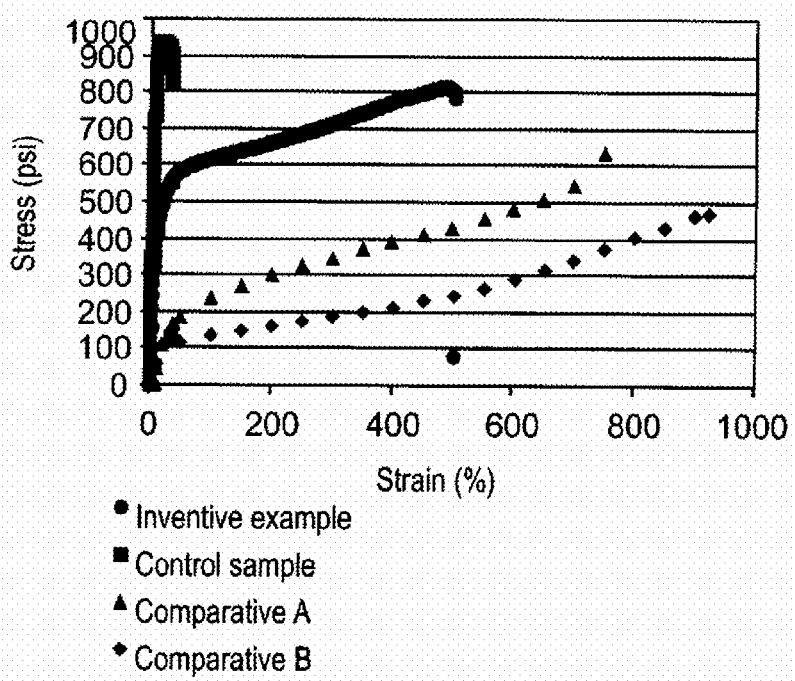
FIG. 20 shows tensile property comparison of the control sample vs. the inventive sample (C1 with 20 wt % oil) as well as two other comparatives.

Tensile property comparison of the control sample vs. the inventive sample 1 (using polymer example C1 with 20 wt % oil) are shown in FIG. 20. It is evident that the inventive sample is superior, not only in its tensile properties, but also in compression set as shown in Table 4. Comparative A is an ethylene/octene elastomer (density 0.865 and MI 0.5) (ENGAGE™ 8150 (The Dow Chemical Company)) blended with 20 wt % oil. Comparative B is an ethylene/octene block copolymer (density 0.866 MI 0.5) (INFUSE™ OBC 9007 (The Dow Chemical Company)) blended with 20 wt % oil.

Example 2 shows a 62 Shore A compound that exhibits lower compression set than the control sample and significantly higher ultimate elongation.

TABLE 4

Mechanical properties of compounds

| | Shore A | Compression Set (70° C.) | Ultimate Stress (psi) | Ultimate Elongation (%) |
|---|---|---|---|---|
| Comparative Example 1 (control sample) | 89 | 83 | 915 | 21 |
| Example 1 | 79 | 61 | 832 | 513 |
| Example 2 | 62 | 66 | 509 | 374 |
| Comparative A with 20 wt % oil | 60 | 100 | 687 | 737 |
| Comparative B with 20 wt % oil | 48 | 66 | 468 | 811 |
| Comparative C with 20 wt % oil | 65 | 107 | 311 | 100 |
| Comparative D with 40 wt % oil | 78 | 85 | 451 | 15 |

While the invention has been described with respect to a limited number of embodiments, the specific features of one embodiment should not be attributed to other embodiments of the invention. No single embodiment is representative of all aspects of the invention. In some embodiments, the compositions or methods may include numerous compounds or steps not mentioned herein. In other embodiments, the compositions or methods do not include, or are substantially free of, any compounds or steps not enumerated herein. Variations and modifications from the described embodiments exist. The method of making the resins is described as comprising a number of acts or steps. These steps or acts may be practiced in any sequence or order unless otherwise indicated. Finally, any number disclosed herein should be construed to mean approximate, regardless of whether the word "about" or "approximately" is used in describing the number. The appended claims intend to cover all those modifications and variations as falling within the scope of the invention.

The invention claimed is:

1. An elastomer composition comprising:
a) a block composite;
b) an oil; and, optionally,
c) a filler; or
d) a polyolefin
wherein the composition has a Shore A of 50 to 90; and,
wherein the block composite comprises a soft copolymer, a hard polymer and a block copolymer having a soft segment and a hard segment, wherein the hard segment of the block copolymer is the same composition as the hard polymer in the block composite and the soft segment of the block copolymer is the same composition as the soft copolymer of the block composite and the block copolymer is a diblock copolymer having isotactic polypropylene blocks and ethylene-propylene blocks wherein the isotactic polypropylene blocks and ethylene-propylene blocks of the diblock copolymers are joined end-to-end.

2. The composition of claim 1 wherein the ethylene-propylene blocks comprise 10 mol % to less than 70 mol % ethylene.

3. The composition of claim 1 wherein the ethylene-propylene blocks comprise 30 mol % to 75 mol %.

4. The composition of claim 1 wherein the ethylene-propylene blocks comprise 33 mol % to 65 mol %.

5. The composition of claim 1 wherein the isotactic polypropylene blocks are present in an amount of 5 wt % to 50 wt % and the ethylene-propylene blocks are present in an amount of 50 wt % to 95 wt %.

6. The composition of claim 1 comprising 100 parts block composite, 50 to 150 phr oil, 0 to 100 phr polyolefin and 0 to 200 phr filler.

7. The composition of claim 1 having a fine dispersed phase morphology having a narrowest dimension of less than 100 nm.

8. The composition of claim 1 having a compression set of 40% to 70% as measured according to ASTM D395.

9. The composition of claim 1 further comprising the polyolefin wherein the polyolefin is polyethylene, polypropylene or combinations thereof.

10. An article comprising the composition of claim 1.

11. The article of claim 10 wherein the article is selected from the group consisting of an injection molded article, a thermoformed article, or a calendared article.

* * * * *